US008045485B2

(12) United States Patent
Shima et al.

(10) Patent No.: US 8,045,485 B2
(45) Date of Patent: Oct. 25, 2011

(54) MONITORING TECHNIQUE OF A DEVICE CONNECTED TO A NETWORK

(75) Inventors: Toshihiro Shima, Shiojiri (JP); Takuya Abe, Shiojiri (JP); Akira Matsumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 507 days.

(21) Appl. No.: 11/730,458

(22) Filed: Apr. 2, 2007

(65) Prior Publication Data

US 2007/0230463 A1    Oct. 4, 2007

(30) Foreign Application Priority Data

Apr. 3, 2006  (JP) ................................. 2006-101294
Sep. 21, 2006 (JP) ................................. 2006-256165

(51) Int. Cl.
*H04L 12/28* (2006.01)

(52) U.S. Cl. ...................................... 370/255; 709/228

(58) Field of Classification Search ................. 370/230, 370/428, 255, 457; 709/223, 228; 714/748
See application file for complete search history.

(56) References Cited

U.S. PATENT DOCUMENTS

| 7,492,877 | B2 | 2/2009 | Yamagishi et al. | |
| 2004/0019671 | A1* | 1/2004 | Metz | 709/223 |
| 2005/0050424 | A1* | 3/2005 | Matsuura | 714/748 |
| 2005/0058149 | A1* | 3/2005 | Howe | 370/428 |
| 2005/0190797 | A1* | 9/2005 | Elliot | 370/503 |
| 2006/0153246 | A1* | 7/2006 | Aoki et al. | 370/508 |
| 2007/0104105 | A1* | 5/2007 | MeLampy et al. | 370/235 |

FOREIGN PATENT DOCUMENTS

| JP | 2002-073438 A | 3/2002 |
| JP | 2003-099340 A | 4/2003 |
| JP | 2004-056521 A | 2/2004 |
| JP | 2004-193688 A | 7/2004 |
| JP | 2005-4735 A | 1/2005 |
| JP | 2005-108241 A | 4/2005 |
| JP | 2005-175625 A | 6/2005 |

* cited by examiner

*Primary Examiner* — Derrick Ferris
*Assistant Examiner* — Matthew Hopkins

(57) ABSTRACT

The invention provides a technique improving the reliability of acquisition of management information from a network device. A monitoring apparatus has a network device identifier extraction unit configured to extract a network device identifier to identify a network device in the network from communication data sent over the network by the network device, the network device identifier assigned to the network device being changeable over time; an individual identification information acquiring unit configured to acquire an individual identification information from a specific network device that is identified by the network device identifier, the individual identification information uniquely and universally identifying the network device; a monitoring subject determination unit configured to determine whether the specific network device is a monitoring subject device that is subject to monitoring, based on the individual identification information; and a management information acquiring unit configured to acquire a management information from the specific network device when the specific network device is determined to be a monitoring subject device, the management information being an information relating to the specific network device and changing over time.

9 Claims, 14 Drawing Sheets

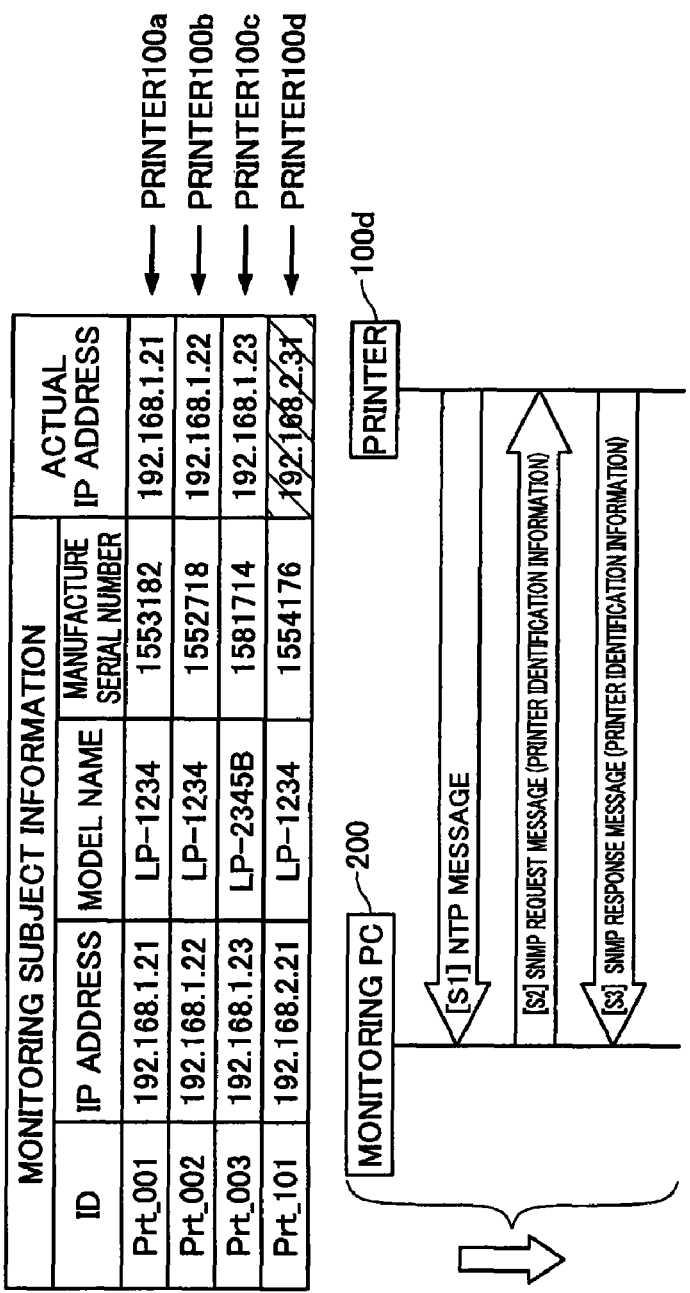
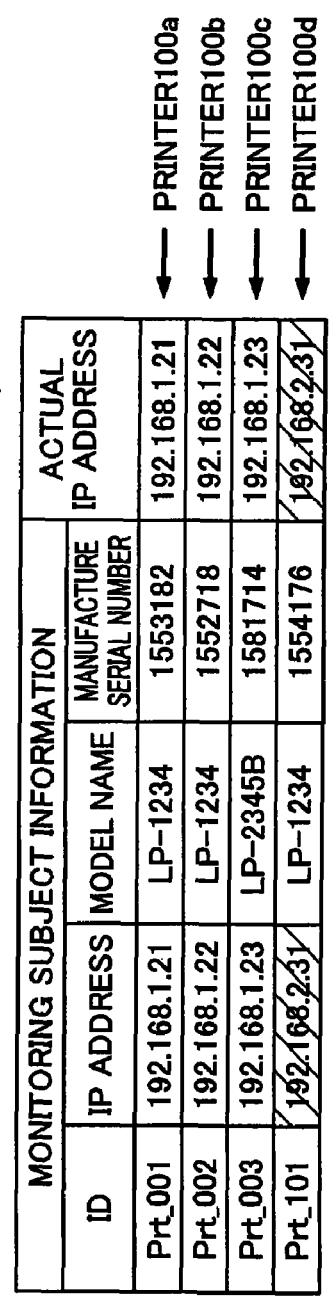
Fig.8A
PRINTER 100d
(ID = Prt_101)
IP ADDRESS
IS CHANGED
Fig.8B
Fig.8C
PRINTER 100d
(ID = Prt_101)
REGISTRATION
ADDRESS
IS MODIFIED

| MONTORING SUBJECT INFORMATION | | | |
|---|---|---|---|
| ID | IP ADDRESS | MODEL NAME | MANUFACTURE SERIAL NUMBER |
| Prt_001 | 192.168.1.21 | LP-1234 | 1553182 |
| Prt_002 | 192.168.1.22 | LP-1234 | 1552718 |
| Prt_003 | 192.168.1.23 | LP-2345B | 1581714 |
| Prt_101 | 192.168.2.21 | LP-1234 | 1554176 |
| Prt_102 | 192.168.2.22 | LP-1234 | 1554179 |

MONITORING TECHNIQUE OF A DEVICE CONNECTED TO A NETWORK

CROSS-REFERENCE TO RELATED APPLICATIONS

The present application claims the priority based on Japanese Patent Application No. 2006-101294 filed on Apr. 3, 2006 and Japanese Patent Application No. 2006-256165 filed on Sep. 21, 2006, the disclosures of which are hereby incorporated herein by reference in its entirety.

BACKGROUND OF THE INVENTION

1. Field of the Invention

The present invention relates to a device monitoring technique that acquires management information from a device connected to a network.

2. Description of the Related Art

In a printer management system that manages a printer connected to a network, the management such as printer maintenance and accounting is performed based on specific management information. The management information may include information on the printer such as the total printed sheet count, trouble information, the print job count, and usage of consumable supply (for example, paper and toner) for each print job. To acquire this kind of management information, a printer monitoring apparatus for monitoring the printer is connected to the network.

Acquisition of the management information with the printer monitoring apparatus, in many cases, is performed with Simple Network Management Protocol (SNMP). Specifically, to acquire the management information with SNMP, the printer monitoring apparatus sends to the printer a request message requiring the management information, and the printer sends to the printer monitoring apparatus a response message in response to the request message.

However, with SNMP, the destination of the sending and receiving message is identified by an IP address, so a problem may arise under environments in which the IP address may change. For example, when printer management is performed with the NetBIOS protocol, since the printer is specified using a NetBIOS name, the printer IP address may be set dynamically using Dynamic Host Configuration Protocol (DHCP). Also, a fixed IP address of a printer may be changed with relocation of the printer. In these cases, there is the risk that the printer monitoring apparatus is not able to send SNMP messages to the printer subject to monitoring, and to acquire the management information. This problem is common not only to cases when the printer is identified by an IP address, but also generally in cases when the information for identifying the printer may change. This problem is also common not only to a printer monitoring apparatus that acquires printer management information, but also to other device monitoring apparatus that acquires management information of individual device connected to a network.

SUMMARY OF THE INVENTION

An object of the present invention is to provide a technology that improves the reliability of acquisition of management information from a network device.

According to an aspect of the present invention, a monitoring apparatus for monitoring one or more network devices is provided. The monitoring apparatus has a network identifier extraction unit configured to extract a network device identifier to identify a network device in the network from communication data sent over the network by the network device according to a predetermined network protocol, the network device identifier being assigned to the network device being changeable over time; an individual identification information acquiring unit configured to acquire an individual identification information from a specific network device that is identified by the network device identifier extracted by the network device identifier extraction unit, the individual identification information uniquely and universally identifying a network device; a monitoring subject determination unit configured to determine whether the specific network device is a monitoring subject device that is subject to monitoring by the monitoring apparatus, based on the individual identification information acquired by the individual identification information acquiring unit; and a management information acquiring unit configured to acquire management information from the specific network device when the specific network device is determined to be a monitoring subject device by the monitoring subject determination unit, the management information being information relating to the specific network device and changing over time.

With this arrangement, a network identifier contained in a message sent on the network by the network device is extracted. With the extracted network identifier, the monitoring apparatus may identify the device subject to monitoring. This allows the monitoring apparatus to acquire management information from the device subject to monitoring much reliably.

The present invention can be implemented in any of various ways, and may be realized in the form of a network device management system and a network device management method, a network device monitoring apparatus and a network device monitoring method used with these monitoring system and monitoring method, a computer program for realizing the functions of these management system, management method, monitoring apparatus and monitoring method, a recording medium on which that computer program is recorded, or in some other form.

These and other objects, features, aspects, and advantages of the present invention will become more apparent from the following detailed description of the preferred embodiments with the accompanying drawings.

BRIEF DESCRIPTION OF THE DRAWINGS

FIG. 8A shows the state of the monitoring subject information after changing of the IP address of the printer.

FIG. 8B shows the typical message transmitted between the monitoring PC and the printer.

FIG. 8C shows the monitoring subject information after updating of the printer registered address.

DESCRIPTION OF THE PREFERRED EMBODIMENT

Embodiments of the present invention will be described below in the following sequence:
A. First Embodiment:
B. Second Embodiment:
C. Third Embodiment:
D. Variations:

A. First Embodiment

Figure 1:
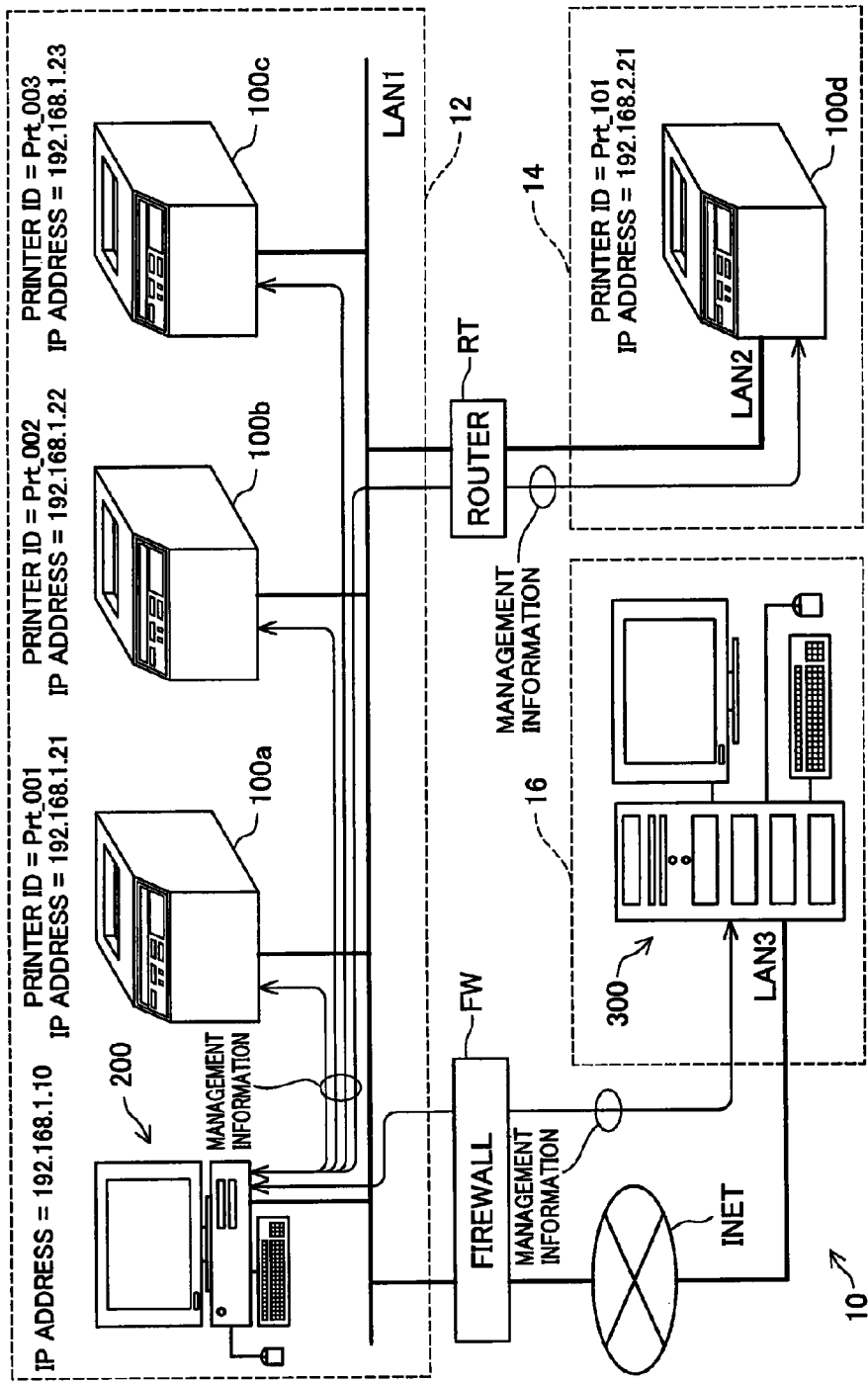
FIG. 1 is an explanatory drawing showing the configuration of the printer management system in the first embodiment.

FIG. 1 is an explanatory drawing showing the configuration of the printer management system 10 in the first embodiment. In this printer management system 10, a first network system 12 and a second network system 14 are connected to each other via a router RT. The first network system 12 and a third network system 16 are connected to each other via a firewall FW and the internet INET.

These three network systems 12, 14, and 16 have network devices (hereafter also called simply "devices") such as computers 200 and 300, and printers 100a to 100d. Data is sent and received between the devices according to TCP/IP protocol. In the first embodiment, a wired network specified by IEEE 802.3 is used for the local area networks LAN1, LAN2, and LAN3 that connect the devices in each of the network systems 12, 14, and 16. A wireless network system such as IEEE 802.11b/g/a may also be used for the local area networks LAN1, LAN2, and LAN3.

For each device of the first network system 12, 32-bit IP address is assigned. The upper 24 bits of the assigned IP addresses are the same value "192.168.1". In this way, the value of a predetermined number of bits of the upper part of the IP address for which the same value is assigned to each device of the network system is called the "network address." A network system for which the network address is the same is called "subnet." The network address of the second network system 14 is set to "192.168.2".

The lower bit value excluding the network address of the IP address is called the host address. By setting the network address of different network systems to mutually different values, as long as setting a unique host address for individual devices in each network system scope, it is possible to set the IP addresses which do not overlap for each device for all of a plurality of network systems. With the example in FIG. 1, the network address of the first network system 12 and the second network system 14 are different and different host addresses are assigned to each device of the first network system 12. Because of this, unique IP address through the two network systems 12 and 14 is assigned to each device of the first network system 12 and the second network system 14.

In this way, unique IP addresses are assigned to the individual devices of the two network systems 12 and 14, so the individual devices of the two network systems 12 and 14 connected via the router RT are identified by the IP address. Because of this, it is possible to send and receive data using the TCP/IP protocol via the router RT that does not perform IP address conversion between the devices of the first network system 12 and the devices of the second network system 14. Such a router that does not convert IP address is generally called local routers.

The first network system 12 has a configuration for which three printers 100a to 100c and a personal computer for monitoring 200 (hereafter also simply called "monitoring PC 200") are connected to the local area network LAN1.

A printing jobs is sent from a client (not illustrated) connected to the local area network LAN1 or the local area network LAN2 to one of the three printers 100a to 100c. These printers 100a to 100c execute the printing process according to the printing job sent from the client.

With the example in FIG. 1, fixed IP addresses are assigned to the monitoring PC 200 and the printers 100a to 100c respectively. These IP addresses are set before connecting each device to the local area network LAN1, for example. The IP addresses of the printers 100a to 100c may be set using operating units (not illustrated) that the printers 100a to 100c have, or a personal computer directly connected to the printers 100a to 100c. The IP address of each device can also be automatically assigned by a Dynamic Host Configuration Protocol (DHCP). In this case, each device acquires the IP address assigned by the DHCP when power of the device is turned on. The acquired IP address is used by each device until the power of the device is shutdown.

The second network system 14 has a configuration for which the printer 100d is connected to the local area network LAN2. A printing job is sent to the printer 100d from a client (not illustrated) connected to the local area networks LAN1 and LAN2. With the example in FIG. 1, the same as with the printers 100a to 100c of the first network system 12, a fixed IP address is assigned to the printer 100d of the second network system 14 as well. However, the IP address of the printer 100d may also be automatically assigned by the DHCP server.

With the first embodiment shown in FIG. 1, the three printers 100a to 100c are connected to the local area network LAN1 of the first network system 12, and the one printer 100d is connected to the local area network LAN2 of the second network system 14, but it is also possible to connect any number of one or more printers to the local area networks LAN1 and LAN2.

The third network system 16 has a configuration for which the management server 300 is connected to the local area network LAN3. The third network system 16 differs from the first network system 16 in that it is connected to the internet INET without going via a firewall.

The monitoring PC 200 acquires the management information, which is retained by each of the printers 100a to 100c, from the printers 100a to 100c via the local area network LAN1. Similarly, the monitoring PC 200 acquires the management information retained by the printer 100d via the local area networks LAN1 and LAN2 and the router RT. The acquired management information of the printers 100a to 100d is accumulated in the monitoring PC 200. The management information accumulated in the monitoring PC 200 is sent to the management server 300 as necessary.

As shown in FIG. 1, a printer ID is set for each of the four printers 100a to 100d. With the example in FIG. 1, the printer ID "Prt_001" is set for the printer 100a, and the printer IDs "Prt_002" and "Prt_003" are set for the printers 100b and 100c respectively. Also, the printer ID "Prt_101" is set for the printer 100d. These printer IDs are contained in the management information sent to the management server 300 from the monitoring PC 200.

Here, the local area network LAN1 to which the monitoring PC 200 is connected is connected to the internet INET via the firewall FW. As a result, from the management server 300 side, it is not possible to require a connection to the monitoring PC 200 side beyond the firewall FW and to acquire the management information acquired and accumulated by the monitoring PC 200. In light of this, with the first embodiment, the monitoring PC 200 connects to the management server 300 using HyperText Transfer Protocol (HTTP), and notifies the management information to the management server 300. Between the management PC 200 and the management server 300, from the perspective of security, it is preferable to perform encoded communication using HTTPS protocol which is a sort of HTTP.

Figure 2:
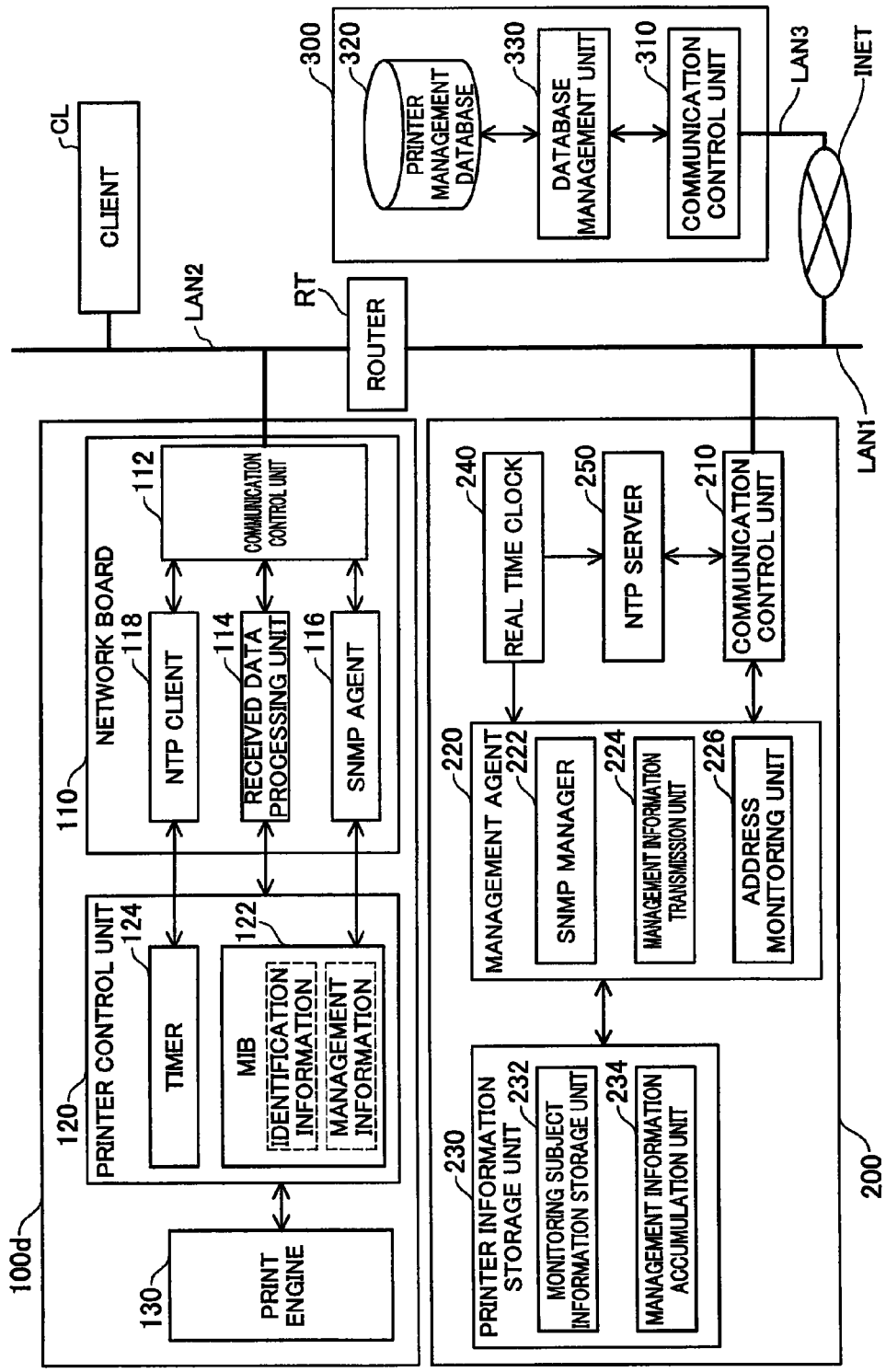
FIG. 2 is an explanatory drawing showing the configurations of the printer, the monitoring PC, and the management server.

FIG. 2 is an explanatory drawing showing the configurations of the printer 100d, the monitoring PC 200, and the management server 300. In FIG. 2, the firewall FW provided between the local area network LAN1 and the internet INET is not illustrated. The printers 100a to 100c of the first network system 12 have the same configuration as the printer 100d, so an illustration and description of the printers 100a to 100c are omitted here also.

The printer 100d has a network board 110, a printer control unit 120, and a print engine 130. Each of the network board 110 and the printer control unit 120 is configured as a computer having a central processing unit (CPU) and a memory (not illustrated). The print engine 130 is a printing mechanism that executes printing according to the given printing data.

The network board 110 has a communication control unit 112, a received data processing unit 114, an SNMP agent 116, and an NTP client 118. The communication control unit 112 controls the network interface (not illustrated) with which the network board 110 is equipped. By controlling the network interface, the communication control unit 112 realizes the function to perform communication according to TCP/IP protocol between the devices connected to the local area network LAN2 and the printer 100d. Communication between the printer 100d and the devices connected to the local area network LAN1 is performed via the router RT connected to the local area network LAN2.

The communication control unit 112, when it receives communication data containing a printing job from the client CL, supplies the received communication data to the received data processing unit 114. The received data processing unit 114 extracts the printing job data from the supplied communication data. The extracted printing job data is supplied to the printer control unit 120. The printer control unit 120 generates printing data according to the printing command contained in the printing job data, and supplies the generated printing data to the print engine 130. The print engine 130 executes printing according to the supplied printing data.

The communication control unit 112 also has the function of transferring communication data between the local area network LAN2 and the SNMP agent 116 according to the Simple Network Management Protocol (SNMP). The communication control unit 112 supplies to the SNMP agent 116 the SNMP message (request message). Here, the request message is a message that requires information to an SNMP manager 222 (described later). The SNMP agent 116 acquires various types of information according to the request message from a database 122 (MIB: Management Information Base) with which the printer control unit 120 is equipped. The SNMP agent 116 generates an SNMP message (response message) from the acquired information, and sends the response message to the SNMP manager 222 via the communication control unit 112.

The printer control unit 120 acquires various types of information relating to the printer 100a as management information, and stores the acquired information in the MIB 122 which is referred by the SNMP agent 116. In the information stored in the MIB 122, there is information uniformly predefined by standards in relation to the printer, and information uniquely defined by the manufacturer. Each information (called an "object" or "MIB information") stored in the MIB 122 is referred by the object ID (OID) assigned to the elements of the information. This object ID is a number delimited by periods such as with "1.3.6.1.2.1.1".

With the printer 100d shown in FIG. 2, stored in the MIB 122 of the printer control unit 120 are management information that changes with the elapse of time and identification information that is unique information to the printer 100d. In the MIB 122, information acquired with no relation to the printing job such as total printed sheet count and the trouble information of the printer 100d are stored as the management information. Various types of information associated with each individual printing job are also stored in the MIB 122 as the management information. As identification information for identifying the individual printer, for example, the model name and the manufacturer serial number of the printer 100d are stored in the MIB 122. The area of the MIB 122 in which the management information is stored may also be called the management information storage unit.

The communication control unit 112 has the function of transferring communication data according to Network Time Protocol (NTP) between the local area network LAN2 and the NTP client 118. The NTP client 118 sends an NTP message inquiring the current time to NTP server 250 (described later) of the monitoring PC 200, and acquires the current time from the message returned from the NTP server 250. The acquired current time is supplied to a timer 124 by the printer control unit 120. This allows each part of the printer 100d to acquire the current time synchronized to the time of the monitoring PC 200 from the timer 124. The sending of the NTP message from the NTP client 118 to the NTP server 250 and the sending of the corrected NTP message from the NTP server 250 to the NTP client 118 are executed as a series of processes. Because of this, the state of this series of processing being performed may also be called a state that the NTP client 118 and the NTP server 250 are connected.

The monitoring PC 200 has the communication control unit 210, the management agent 220, the printer information storage unit 230, a real time clock 240, and the NTP server 250. By acquiring the MIB information of the printer 100d with the functions of each of these parts, the monitoring PC 200 is able to monitor the state of the printer 100d. Because of this, the monitoring PC 200 may be called as a printer monitoring apparatus.

Each function of the communication control unit 210, the management agent 220, and the NTP server 250 is realized by the CPU (not illustrated) with which the monitoring PC 200 is equipped. The printer information storage unit 230 is an area of part of the memory (not illustrated) that the monitoring PC 200 is equipped with.

The communication control unit 210 controls the network interface (not illustrated) with which the monitoring PC 200 is equipped. By controlling the network interface, the communication control unit 210 realizes the function to perform communication according to TCP/IP protocol between the devices connected to the local area network LAN1 and the monitoring PC 200. Communication between the monitoring PC 200 and the devices connected to the local area network LAN2 is performed via the router RT connected to the local area network LAN1.

The real time clock 240 is a battery backed up timer that stores the current time. The current time stored in the real time clock 240 is synchronized by the NTP client (not illustrated) to the time of the standard time server (not illustrated) connected via the internet INET.

When the NTP server 250 receives an NTP message from the NTP client 118, the current time stored in the real time clock 240 is acquired. When the NTP server 250 receives the NTP message from the NTP client 118, it acquires the current time stored in the real time clock 240. The NTP server 250 corrects the NTP message based on the current time acquired from the real time clock 240 and the information contained in the NTP message. The corrected NTP message is returned to the NTP client 118 via the communication control unit 210. As a result, the time of the printer 100d is synchronized to the time of the real time clock 240. As described above, the time of the real time clock 240 is synchronized to the standard time server, so the time of the printer 100d is synchronized to the standard time server.

The management agent 220 has the SNMP manager 222, a management information transmission unit 224, and an address monitoring unit 226. The SNMP manager 222 acquires management information from the MIB 122 of the printer 100d, and stores it in a management information accumulation unit 234 of the printer information storage unit 230. The management information transmission unit 224 sends the information accumulated in the management information accumulation unit 234 to the management server 300 via the communication control unit 210.

The printer information storage unit 230 is equipped with a monitoring subject information storage unit 232 and the management information accumulation unit 234. Stored in advance in the monitoring subject information storage unit 232 is monitoring subject information for which is registered the printer ID, the IP address, and the identification information for each printer subject to monitoring.

Figure 3:
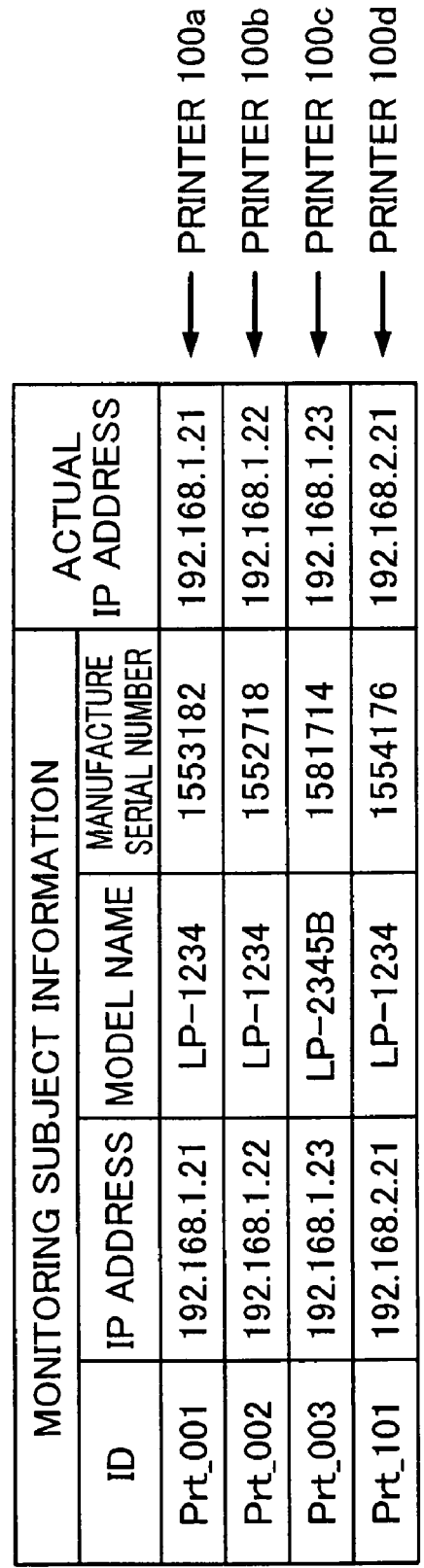
FIG. 3 is an explanatory drawing showing an example of monitoring subject information.

FIG. 3 is an explanatory drawing showing an example of monitoring subject information. With the example of FIG. 3, all the printers 100a to 100d of the first network system 12 and the second network system 14 are set to the monitoring subjects. Because of that, as shown in FIG. 3, stored in the monitoring subject information storage unit 232 are the printer ID, the IP address and the model name and manufacturing number as identification information for each of the printer 100a to 100d.

The SNMP manager 222 of FIG. 2 acquires management information not only from the printer 100d but also from the individual printers (monitoring subject printers) registered in the monitoring subject information storage unit 232. The management information acquired from the individual monitoring subject printers is associated with the printer ID and stored in the management information accumulation unit 234.

When management information is acquired from the printer 100d, first, the SNMP manager 222 refers the monitoring subject information storage unit 232, and acquires the IP address of the printer 100d (printer ID=Prt_101). With the example in FIG. 3, the SNMP manager 222 acquires the IP address "102.168.2.21" registered for the printer 100d. Then, a request message including the object ID that specifies the MIB information is sent to the SNMP agent 116 provided in the printer for which the acquired IP address "192.168.2.21" is assigned.

When the SNMP agent 116 receives the request message, the SNMP agent 116 acquires the MIB information specified by the object ID included in the request message from the MIB 122 with which the printer control unit 122 is equipped. Then, the SNMP agent 116 generates a response message which contains the acquired MIB information. The generated response message is sent from the SNMP agent 116 to the SNMP manager 222.

The SNMP manager 222 receives the response message sent by the SNMP agent 116. By extracting the MIB information contained in the response message, the SNMP manager 222 acquires the management information stored in the MIB 122 of the printer control unit 120.

With SNMP User Datagram Protocol (UDP) of the TCP/IP protocol is used for message transmission. In the UDP data transmission control to ensure communication reliability such as a resend control is not performed. As a result, the communication reliability is not guaranteed. Because of this, there may be the case that the SNMP manager 222 could not receive the response message from the SNMP agent 116 even when a predetermined waiting time has elapsed after sending of the request message to the SNMP agent 116. In this case the SNMP manager 222 resends the request message to the SNMP agent 116. If it is not possible to receive the response message from the SNMP agent 116 even when the request message is sent a predetermined number of times (e.g. 3 times), the destination of the request message is determined to be incapable to response, and acquiring of the MIB information is aborted.

An address monitoring unit 226 monitors the IP addresses of the printer subject to monitoring based on the communication data supplied from the local area network LAN1 to the communication control unit 210. The functions and operation of this address monitoring unit 226 are described later.

The management server 300 has the communication control unit 310, a printer management database 320, and a database management unit 330. The communication control unit 310 performs communication with the monitoring PC 200 via the internet INET by controlling the network interface (not illustrated).

The database management unit 330 associates the management information sent from the monitoring PC 200 to the management server 300 with the printer ID. The associated management information is accumulated in the printer management database 320. The database management unit 330 performs accounting based on the printer ID and the management information, which is accumulated in the printer management database 320, such as quantity of supply consumption and usage of the printer for each print job. With the first embodiment, the management server 300 performs the individual printer management based on the printer ID. In general, it is acceptable as long as management of each printer is possible. For example it is also acceptable that the management server 300 manages the individual printers based on identification information.

Figure 4:
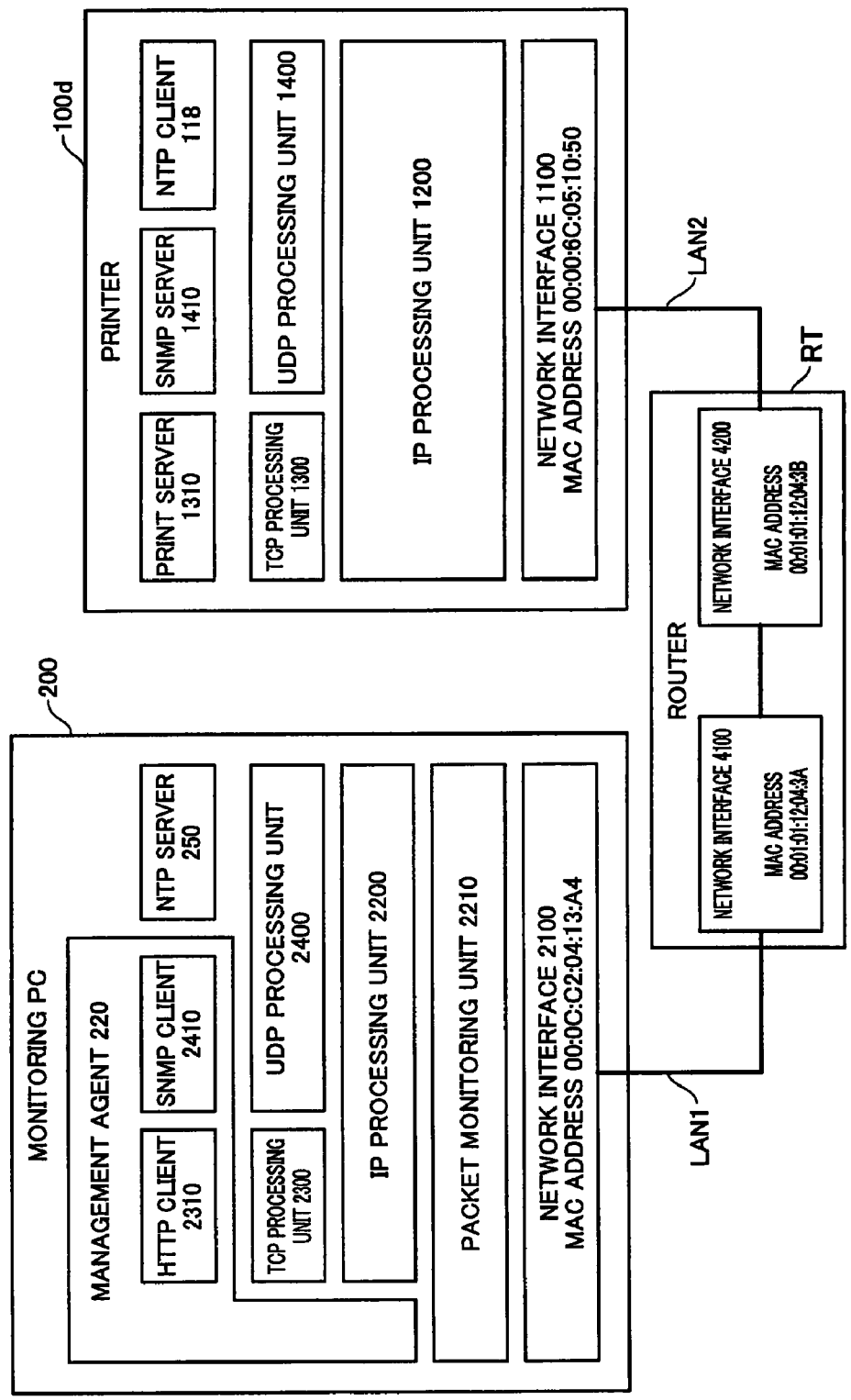
FIG. 4 is a block diagram showing the hierarchical configuration of the functions relating to data communication between the monitoring PC and the printer.

FIG. 4 is a block diagram showing the hierarchical configuration of the functions relating to data communication between the monitoring PC 200 and the printer 100d. With the block diagram shown in FIG. 4, the communication data is transmitted from the upper layer to the bottom layer with the sending side device, and is transmitted from the bottom layer to the upper layer with the receiving side device.

With the monitoring PC 200, the management agent 220 and the NTP server 250 are positioned at its topmost layer. The management agent 220 has an HTTP client 2310 and an SNMP client 2410. The HTTP client 2310 is a function executed by the management information transmission unit 224 of FIG. 2, and the SNMP client 2410 is a function executed by the SNMP manager 222 and the address monitoring unit 226 of FIG. 2.

At the lower layer of the HTTP client 2310 a TCP processing unit 230 is provided. At the lower layer of the SNMP client 2410 and the NTP server 250 a UDP processing unit 2400 is provided. At the lower layer of the TCP processing unit 2300 and the UDP processing unit 2400, in sequence from the top, an IP processing unit 2200, a packet monitoring unit 2210, and a network interface (I/F) 2100 are provided. The packet monitoring unit 2210 is a function executed by the communication control unit 210. The details of the packet monitoring unit 2210 are described later.

A TCP processing unit 2300, a UDP processing unit 2400, and an IP processing unit 2200 are functional modules that execute process relating to protocols compatible with TCP/IP protocol. These functional modules are realized by the communication control unit 210. These functional modules convert data supplied from the upper layer to data according to a compatible protocol, and supply the data after conversion to the lower layer. Each functional module does reverse conversion of the data supplied from the bottom layer and supplies it to the upper layer.

The printer 100*d* has a printer server 1310, an SNMP server 1410, and an NTP client 118 at its topmost layer. The print server 1310 is the print processing function that receives the printing job and executes printing. This print processing function is executed by the received data processing unit 114, the printer control unit 120, and the print engine 130 shown in FIG. 2. Also, the SNMP server 1410 is a function executed by the SNMP agent 116 (FIG. 2).

A TCP processing unit is provided at the lower layer of the printer server 1310. A UDP processing unit 1400 is provided at the lower layer of the SNMP server 1410 and the NTP client 118. In sequence from the top, at the lower layer of the TCP processing unit 1300 and the UDP processing unit 1400 an IP processing unit 1200 and the network interface 1100 are provided. The function and configuration of the TCP processing unit 1300, the UDP processing unit 1400, and the IP processing unit 1200 are the same as TCP processing unit 2300, the UDP processing unit 2400, and the IP processing unit 2200 of the monitoring PC 200.

The router RT has a first network interface 4100 connected to the local area network LAN1, and a second network interface 4200 connected to the local area network LAN2. By connecting these two network interfaces 4100 and 4200, data is transferred between the local area network LAN1 and the local area network LAN2.

As shown in FIG. 4, unique 48-bit numbers called Media Access Control (MAC) addresses are allocated each of the four network interfaces 1100, 2100, 4100, and 4200 which are connected to the local area networks LAN1 and LAN2. This MAC address is used to identify the network interface. To identify the network interface, the MAC addresses are normally set so as to have no overlapping with all of the network interfaces. The destination of the communication data sent within the local area network LAN1 is specified by the MAC address. Similarly, the destination of the communication data sent within the local area network LAN2 is specified by the MAC address.

FIG. 5A through 5D are explanatory drawings showing the format of the communication data when sending an NTP message on the local area networks LAN1 and LAN2. In general, as the NTP message, the version 3 NTP message (NTP3 message) is used. FIG. 5A shows the format of the data packet (hereafter also simply called "packet") sent on the local area networks LAN1 and LAN2. This packet is generally called a MAC frame.

The MAC frame contains a 14 octet (1 octet=8 bits) MAC header, a 46 to 1500 octet user data unit, and a 2 octet check sum. The MAC header has a destination MAC address for identifying the network interface that is the packet destination, a source MAC address for identifying the network interface of the packet sending source, and protocol information (type).

With the example in FIG. 4, when the NTP3 message is sent from the printer 100*d* to the monitoring PC 200, with the MAC frame sent on the local area network LAN2, the MAC address of the network interface 4200 (00:01:01:12:04:3B) is stored in the destination MAC address, and the MAC address of the network interface 1100 (00:00:6C:05:10:50) is stored in the source MAC address. On the other hand, with the MAC frame sent on the local area network LAN1, the MAC address of the network interface 2100 (00:0C:C2:04:13:A4) is stored in the destination MAC address, and the MAC address of the network interface 4100 (00:01:01:12:04:3A) is stored in the source MAC address.

In the check sum which is called the Frame Check Sequence (FCS) of FIG. 5A a 32-bit Cyclic Redundancy Code (CRC) is stored. The CRC is calculated using particular bitwise operation to overall data in the MAC frame. By comparing the frame check sequence within this sent MAC frame and the CRC calculated from the sent MAC frame, it is possible to determine whether or not sending of the MAC frame is performed without error. When the MAC frame is not sent correctly, that MAC frame is discarded. On the other hand, when the MAC frame is sent correctly, the user data is extracted.

The protocol information specifies protocol by which the data stored in the user data unit is processed. For example, when the data stored in the user data unit is an IP datagram processed using the Internet Protocol (IP), a hexadecimal code "0800" is stored in the protocol information. With the example in FIG. 5A, an IP datagram is stored in the user data unit, so a hexadecimal code "0800" is stored in the protocol information. Because of this, the IP datagram that is the user data extracted from the MAC frame is transmitted to the module that processes the IP datagram.

With the example of the printer 100*d* shown in FIG. 4, the IP datagram is transmitted from the network interface 1100 to the IP processing unit 1200, or is transmitted from the IP processing unit 1200. The MAC header and the frame check sequence are added to the IP datagram transmitted from the IP processing unit 1200 to the network interface 1100, and the MAC frame is generated.

On the other hand, with the monitoring PC 200, the IP datagram is transmitted to the IP processing unit 2200 via the packet monitoring unit 2210. The packet monitoring unit 2210 monitors the IP datagram transferred between the network interface 2100 and the IP processing unit 2200. Then, the source IP address and the destination port number (these data will be described later) contained in the received IP datagram are captured. The captured data are supplied to the address monitoring unit 226 (FIG. 2) of the management agent 220. The packet monitoring unit 2210 transmits the IP datagram transferred between the IP processing unit 2200 and the network interface 2100 without any modification.

The data supplied to the address monitoring unit 226 from the packet monitoring unit 2210 may contain all of the source IP address, the destination IP address, the source port number, and the destination port number contained in the IP datagram. It is also acceptable that the packet monitoring unit 2210 determines whether or not the message contained in the IP datagram is an NTP message, and to supply only the source IP address of an IP datagram that contains an NTP message to the address monitoring unit 226.

With the router RT, the IP datagram is transmitted between the two network interfaces 4100 and 4200. The router RT determines whether or not to perform transmission of the IP datagram according to the contents of the IP datagram.

FIG. 5B shows the format of the IP datagram. The IP datagram contains control information, the source IP address, the destination IP address, option data and padding data (hereafter also called "padding"), and the UDP datagram. FIG. 5B shows an example of the NTP3 message using UDP for transmission, so the UDP datagram is stored subsequent to the padding. Generally, transmitting data according to the protocol used for transmission is stored subsequent to the padding. The control information specifies upper layer protocol which process the data stored subsequent to the padding.

Figure 5:
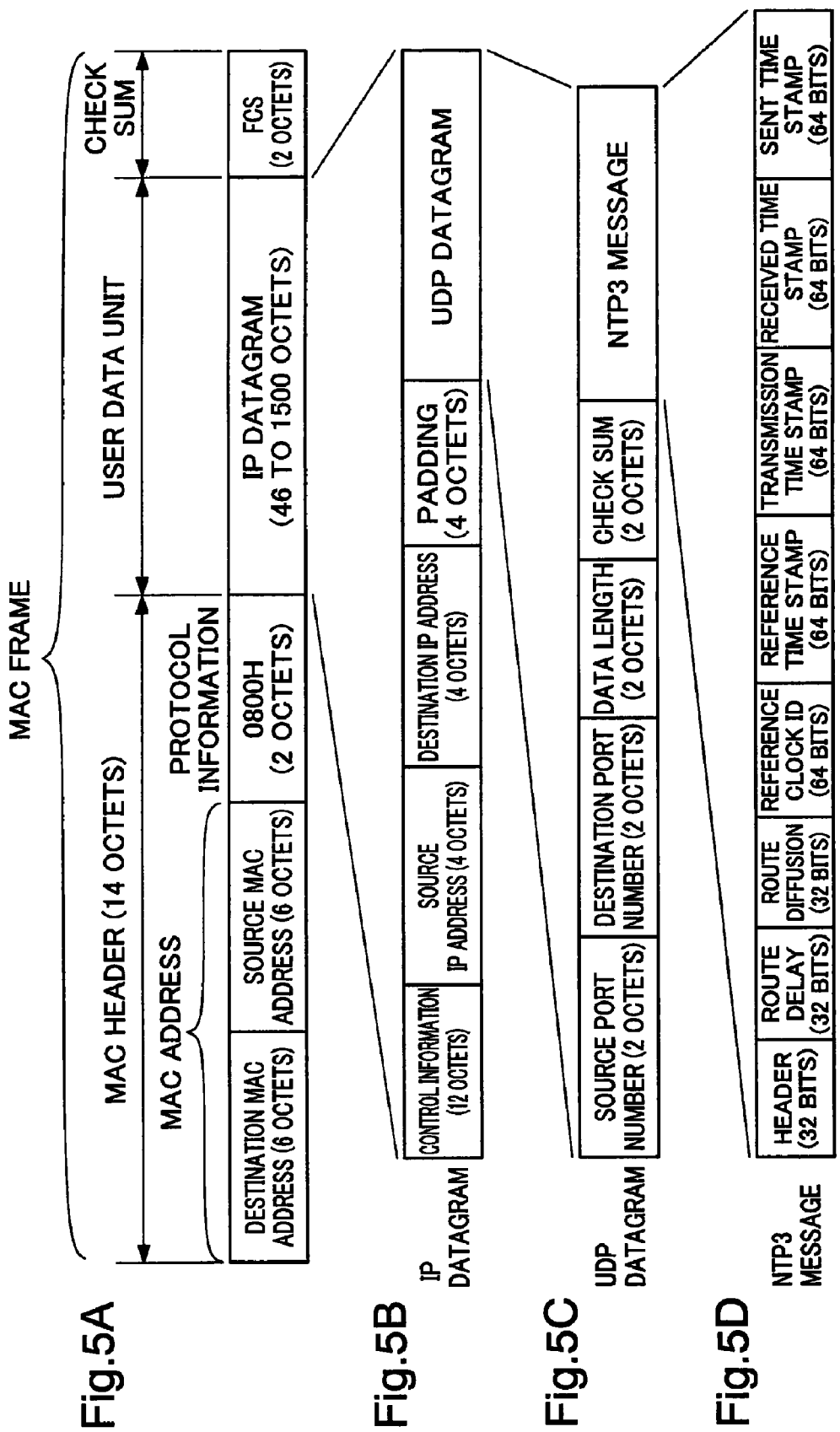
FIG. 5A shows the format of the data packet sent on the local area networks.
FIG. 5B shows the format of the IP datagram.
FIG. 5C shows the format of the UDP datagram.
FIG. 5D shows the format of the NTP3 message.

FIG. 5C shows the format of the UDP datagram. The UDP datagram contains the source port number, the destination port number, the data length, the check sum, and the NTP3 message. The destination port number is the value that specifies upper layer protocol processing the data stored subsequent to the check sum. With the example in FIG. 5, the NTP3 message is stored subsequent to the check sum. Generally, the message according to the upper layer protocol specified by the destination port number is stored subsequent to the check sum.

FIG. 5D shows the format of the NTP3 message. The NTP3 message has the control information, the route delay and route diffusion which are information relating to the transmission delay on the network, and the reference clock ID and four time stamps that are information relating to time. When the NTP server 250 (FIG. 4) receives the NTP3 message shown in FIG. 5D, the NTP server 250 generates an NTP3 message for which these information are corrected, and returns this to the NTP client 118 (FIG. 4).

As shown in FIG. 4 and FIGS. 5A through 5D, with the communication data of the NTP3 message sent on the local area networks LN1 and LAN2 shown in FIG. 4, the MAC address (FIG. 5A) is changed by the router RT. As a result, the information which can identify the sending source of the NTP3 message sent via the router RT is the source IP address contained in the IP datagram (FIG. 5B).

Figure 6:
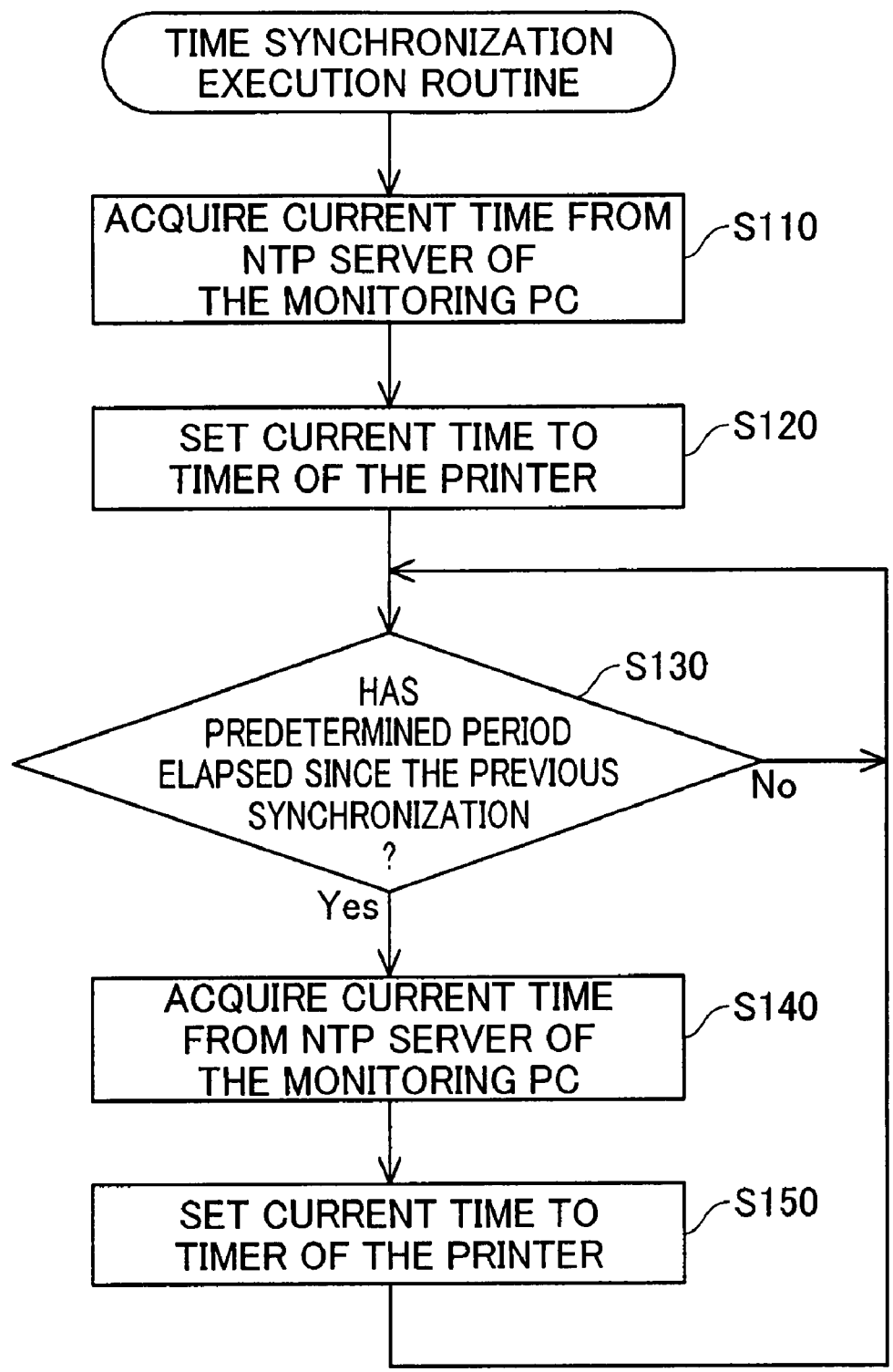
FIG. 6 is a flowchart showing the time synchronization execution routine executed by the NTP client.

FIG. 6 is a flowchart showing the time synchronization execution routine executed by the NTP client of the printer 100*d* (FIG. 2). This time synchronization execution routine is activated when the printer 100*d* is started up. The printer 100*d* may be set up not to execute the time synchronization execution routine without activating the NTP client 118. However in the case that the printer 100*d* is subject to monitoring by the monitoring PC 200 (FIG. 2), the printer 100*d* is set so that the NTP client 118 is activated and the time synchronization execution routine is executed at the time of start up of the printer 100*d*. Change of this setting by the user is prohibited.

At step S110, the NTP client 118 acquires the current time from the NTP server 250 of the monitoring PC 200 (FIG. 2). This monitoring PC 200 from which the NTP client 118 acquires the current time is set in advance. Change of this setting by the user is also prohibited. Because of this, the NTP client 118 always sends NTP messages to the monitoring PC 200 and receives corrected NTP messages from the monitoring PC 200. At step S120, the NTP client 118 sets the acquired current time to the timer 124 of the printer 100*d*.

At step S130, the NTP client 118 determines whether or not a predetermined period has elapsed since the previous synchronization. When it is determined that a predetermined period has not elapsed since the previous synchronization, the control is returned to step S130 and this is executed repeatedly. On the other hand, when it is determined that a predetermined period has elapsed since the previous synchronization, the control moves to step S140. The predetermined period is set as appropriate according to the clock precision of the printer 100*d* and so on.

At step S140, the same as with step S110, acquiring of the current time is performed, and at step S150, the same as with step S120, setting of the acquired current time to the timer 124 is performed. After setting of the current time at step S150, the control returns to step S130. In this way, by the time synchronization execution routine shown in FIG. 6 being executed, NTP messages are sent from the printer 100*d* to the monitoring PC 200 at the predetermined intervals.

Figure 7:
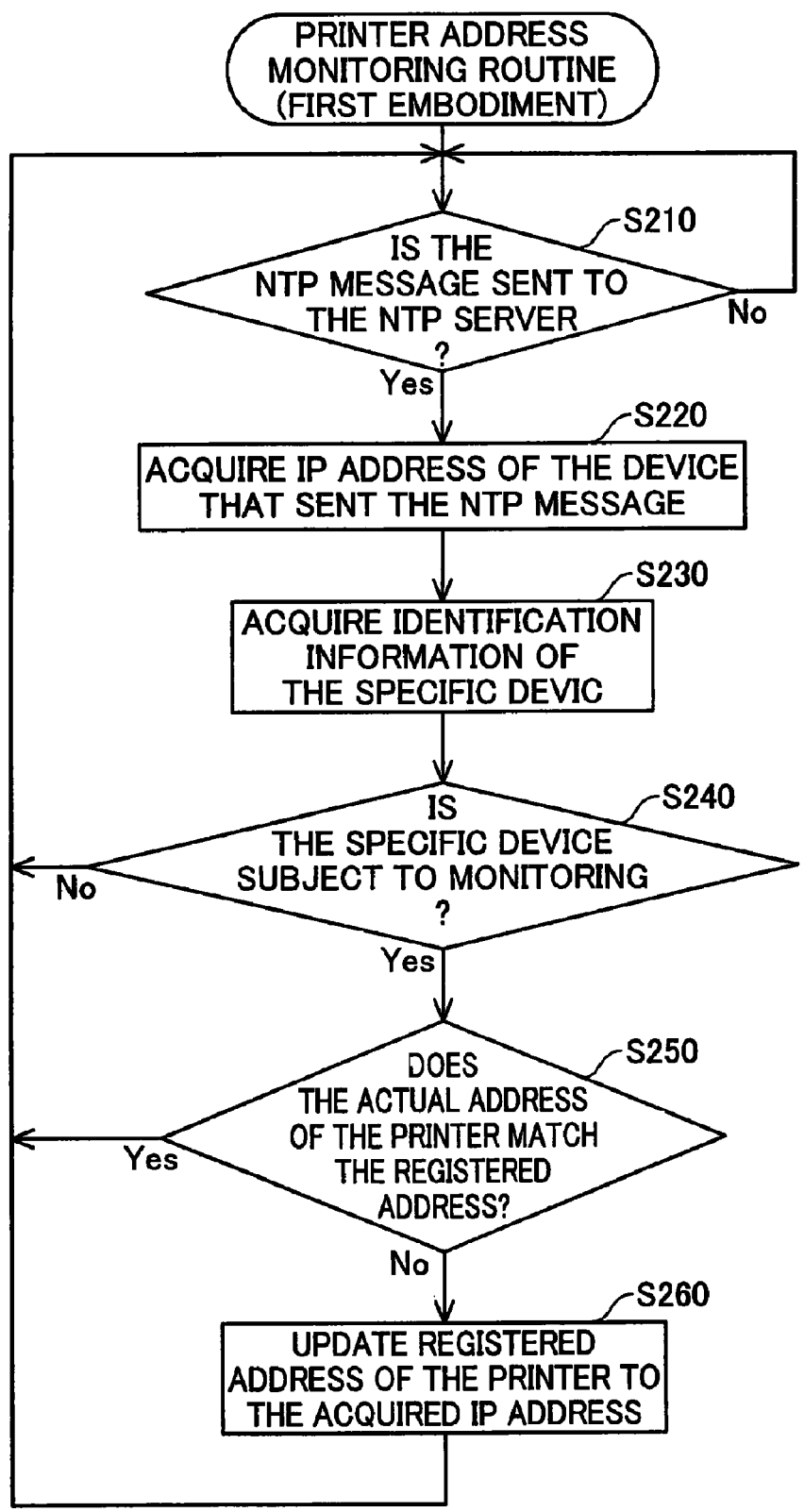
FIG. 7 is a flowchart showing the printer address monitoring routine executed by the address monitoring unit.

FIG. 7 is a flowchart showing the printer address monitoring routine executed by the address monitoring unit 226 of the monitoring PC 200 (FIG. 2). This printer address monitoring routine is activated subsequent to activation of the NTP server 250 (FIG. 2) when the monitoring PC 200 is started up.

At step S210, the address monitoring unit 226 determines whether or not the NTP message is sent to the NTP server 250. Specifically, the address monitoring unit 226 determines whether or not the NTP message is sent to the NTP server 250 based on the destination port number of the received data acquired by the packet monitoring unit 2210 (FIG. 4). When it is determined that the NTP message is sent, the control moves to step S220. On the other hand, when it is determined that the NTP message is not sent, the control returns to step S210 and this is repeatedly executed.

At step S220, the address monitoring unit 226 acquires the IP address of the NTP message sending source. The IP address of the NTP message sending source may be acquired from the source IP address of the received data that contains the NTP message captured by the packet monitoring unit 2210 (FIG. 4).

At step S230, the address monitoring unit 226 acquires the identification information from the device identified by the IP address captured at step S220 (specific device). Specifically, the address monitoring unit 226 sends a request message requesting sending of the identification information to the specific device of which IP address is captured at step S220. Then, by acquiring the response message from the specific device, the address monitoring unit 226 acquires the printer identification information. However, when acquiring of the response message fails, the request message is resent for a predetermined number of times (e.g. 3 times). After resending, when the response message cannot be received, acquiring of the identification information is aborted.

At step S240, the address monitoring unit 226 determines whether or not the specific device is a monitoring subject printer based on the acquired identification information. Specifically, the address monitoring unit 226 searches the monitoring subject information stored in the monitoring subject information storage unit 232 (FIG. 2), and determines whether or not there is a printer that matches the model name and manufacture serial number contained in the acquired information. When there is a printer that matches the identification information, the specific device is determined to be a monitoring subject printer, and the control moves to step S250. On the other hand, when there is no printer that matches the identification information, the specific device is determined not to be a monitoring subject printer, and the control returns to step S210. Also, at step S230, even when acquiring of the identification information is aborted, the specific device is determined not to be a monitoring subject printer, and the control returns to step S210.

At step S250, the address monitoring unit 226 determines whether or not the IP address of the printer subject to monitoring captured at step S230 (actual address) matches the IP address of the printer registered in the monitoring subject information (registered address). When it is determined that the actual address matches the registered address, the control returns to step S210. On the other hand, when it is determined that the actual address does not match the registered address, the control moves to step S260. It is also acceptable to update the IP address registered to the monitoring subject information for every capturing of the actual address of the printer subject to monitoring by omitting step S250.

At step S260, the address monitoring unit 226 updates the printer registered address to the actual address by rewriting the monitoring subject information storage unit 232. After the registered address is updated, the control returns to step S210.

FIG. 8A shows the state of the monitoring subject information immediately after changing of the IP address of the printer 100d (host address). FIG. 8A differs from FIG. 3 in that the actual IP address of the printer 100d shown by cross hatching in FIG. 8A is changed to "192.168.2.31". The remaining points are the same as in FIG. 3.

With the state shown in FIG. 8A, the IP address registered in the monitoring subject information differs from the actual IP address of the actual printer 100d. In this state, since the monitoring PC 200 (FIG. 2) acquires the management information with the SNMP which specifies destination of request message by the IP address, it is not possible for the monitoring PC 200 to acquire the management information of the printer 100d.

FIG. 8B shows the typical message transmitted between the monitoring PC 200 and the printer 100d when registered address of the printer 100d is updated.

At step [S1] of FIG. 8B, NTP client 118 (FIG. 2) of the printer 100d, which executes the time synchronization execution routine shown in FIG. 6, sends the NTP message to the monitoring PC 200 (steps S110, S140). The address monitoring unit 226 (FIG. 2) of the monitoring PC 200, which executes the printer address monitoring routine shown in FIG. 7, acquires the IP address of the printer 100d (steps S210, 220).

At step [S2] of FIG. 8B, an SNMP message requesting sending of identification information from the address monitoring unit 226 of the monitoring PC 200 is sent to the printer 100d. Next, at step [S3], the address monitoring unit 226 receives an SNMP message containing the identification information returned from the printer 100d. The address monitoring unit 226 updates registered address of the printer 100d based on this identification information received from the printer 100d and the actual IP address of the printer 100d acquired at step [S1], as described above.

FIG. 8C shows the monitoring subject information after updating of the printer 100d registered address. FIG. 8C differs from FIG. 8A in that the IP address of the printer 100d registered in the monitoring subject information is updated to the actual IP address. The remaining points are the same as in FIG. 8A.

As shown in FIG. 8C, by updating the registered address, the IP address registered in the monitoring subject information is modified to the same as the actual IP address of the actual printer 100d. Because of this, with the state shown in FIG. 8C, the monitoring PC 200 (FIG. 2) may identify the printer 100d using the IP address, and may acquire the management information of the printer 100d using SNMP.

In this way, with the first embodiment, by the printer 100d executing time synchronization, the monitoring PC 200 captures the IP address that identifies the printer 100d. The monitoring PC 200 acquires the identification information from the specific device identified by the captured IP address. When it is determined from the acquired identification information that the specific device is a monitoring subject printer, the monitoring subject information is updated with the IP address of the printer 100d. This allows the monitoring PC 200 to monitor the printer 100d identified by the IP address even when the IP address of the printer 100d is changed.

Generally, with printers for which management is performed via a network, it is preferable to accurately record the occurrence time of various events such as the occurrence of problems, start of printing job and end of printing job. Because of this, this kind of printer has the NTP client function for achieving time synchronization with the external NTP server as a regular function. With the first embodiment, the monitoring PC 200 is able to acquire the IP address of the printer 100d by receiving an NTP message sent from the NTP client 118 which is the function normally held by the printer 100d being subject to monitoring in this way. Because of this, it is possible to acquire the IP address of the printer 100d without adding new functions to the printer 100d, and to perform monitoring of the printer identified by the IP address. Since the printer 100d performing time synchronization with the monitoring PC 200, it is also possible to obtain further effect to allow synchronize each other's times.

With the first embodiment, as shown in FIG. 6, the time synchronization in the printer 100d is performed at the startup of the printer 100d (steps S110, S120) and at predetermined intervals (S140, S150). It is also acceptable to perform time synchronization at the time of the startup of the printer 100d or at every predetermined interval. Also, with the first embodiment, the time synchronization in the printer 100d is performed once at the predetermined interval, but it is also possible to perform it at least once at the predetermined interval.

B. Second Embodiment

Figure 9:
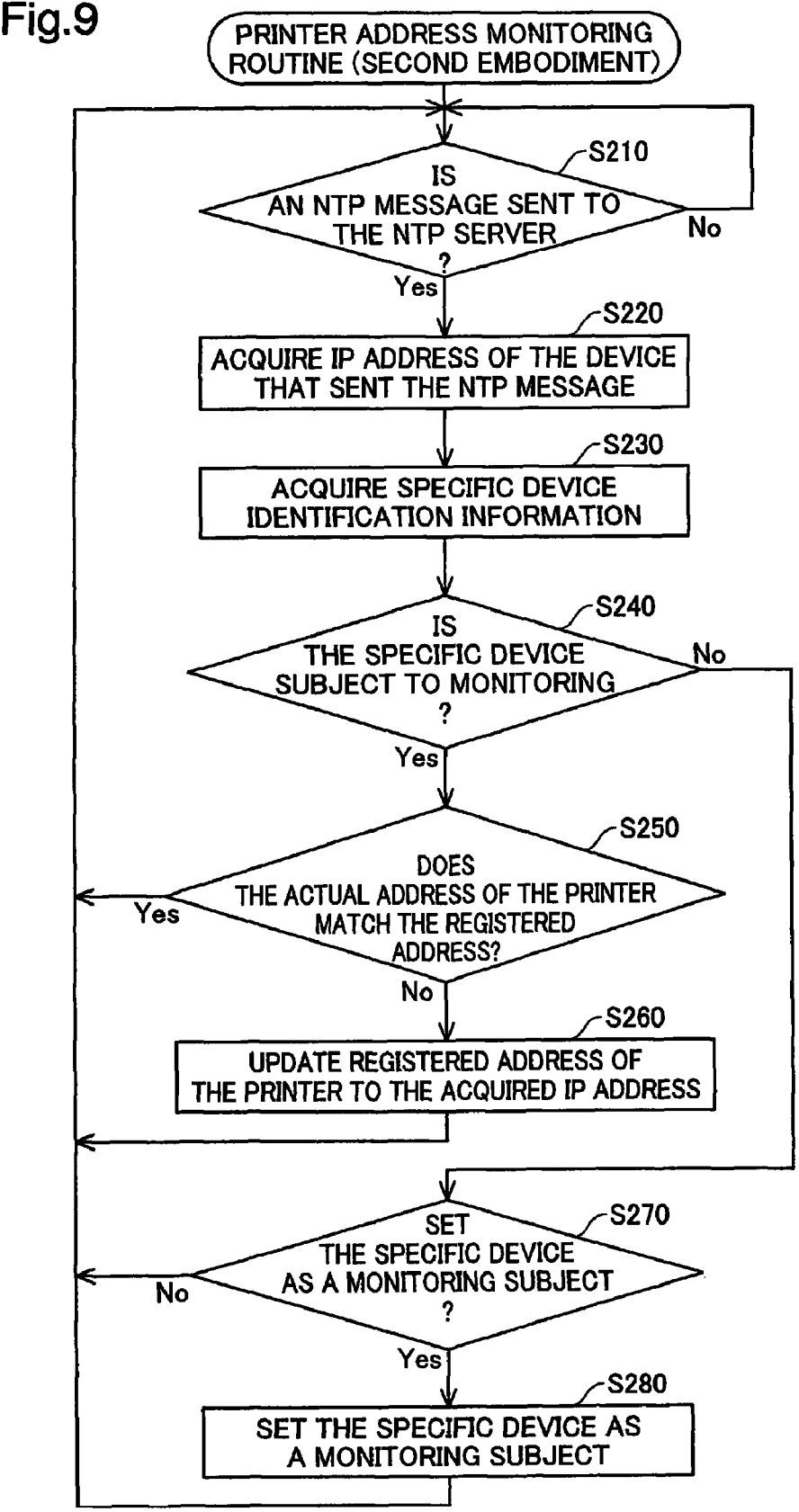
FIG. 9 is a flowchart showing the printer address monitoring routine executed by the address monitoring unit in the second embodiment.

FIG. 9 is a flowchart showing the printer address monitoring routine executed by the address monitoring unit 226 (FIG. 2) with the second embodiment. The printer address monitoring routine of the second embodiment shown in FIG. 8 differs from the printer address monitoring routine of the first embodiment shown in FIG. 7 in that steps S270 and S280 are added, and in that when it is determined at step S240 that the specific device is not a monitoring subject printer, the control moves to step S270. The remaining points are the same as with the first embodiment.

At step S270, the address monitoring unit 226 determines whether or not the specific device is subject to monitoring by the monitoring PC 200 (FIG. 2). Specifically, a dialog box, which allows the user of the monitoring PC 200 to input an instruction whether or not to add the specific device as a monitoring subject, is displayed on a display (not illustrated) of the monitoring PC 200. Then, according to the instruction of the user input with the dialog box, it is determined whether or not to add the specific device to the monitoring subjects. When it is determined by the address monitoring unit 226 to add the specific device to the monitoring subjects, the control moves to step S280. On the other hand, when it is determined by the address monitoring unit 226 not to add the specific device to the monitoring subjects, the control returns to step S210.

Figures 10A, 10B:
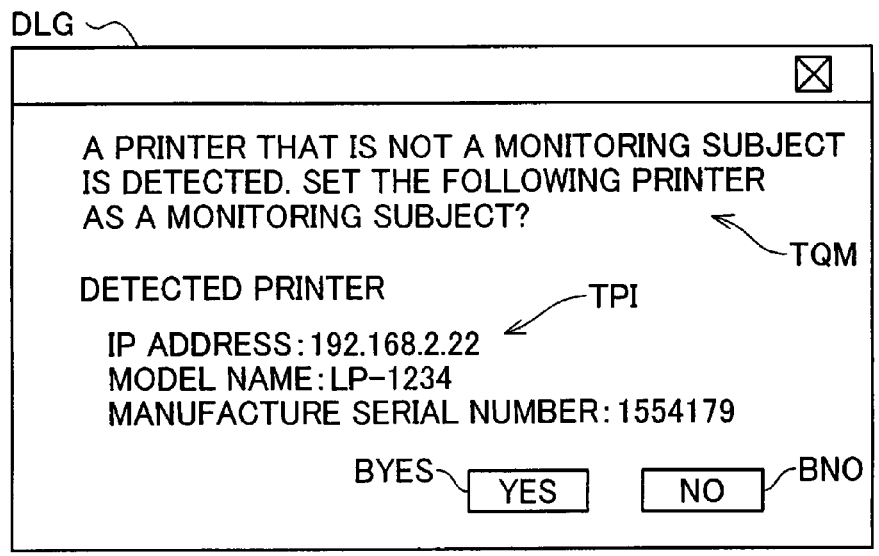
FIG. 10A shows an example of a dialog box displayed on the display of the monitoring PC.
FIG. 10B shows the monitoring subject information for which the specific device is added to the monitoring subjects.

FIG. 10A shows an example of a dialog box DLG displayed on the display of the monitoring PC 200 at step S270. As shown in FIG. 10A, displayed on the dialog box DLG are a message TQM inquiring of the user whether or not the specific device is to be added to the monitoring subjects and information TPI relating to the specific device. With the example in FIG. 10A, as the information relating to the specific device, the IP address, the model name and manufacture serial number included in the identification information are displayed on the dialog box DLG.

The user input an instruction whether or not to add the specific device to the monitoring subjects by clicking two buttons BYES or BNO provided on the dialog box DLG according to the display contents TQM and TPI of the dialog box DLG. With the example in FIG. 10A, when the user clicks the button BYES, the specific device is added to the monitoring subjects, and when the user clicks the button BNO, the specific device is not added to the monitoring subjects.

At step S280, the address monitoring unit 226 assigns a printer ID to the printer that is the specific device, and the printer ID, the IP address, the model name, and the manufacture serial number are added to the monitoring subject information stored in the monitoring subject information storage unit 232 (FIG. 2). As a result, the specific device becomes a subject of monitoring by the monitoring PC 200, and the management information is acquired by the management agent 220 (FIG. 2).

FIG. 10B shows the monitoring subject information to which the information relating to the specific device is added. The information is added to the monitoring subject information at step S280 according to the user's instruction to set the specific device to subject to monitoring with the example in FIG. 10A. As shown in FIG. 10B, information relating to the printer to be added to the monitoring subjects is added to the monitoring subject information shown in FIG. 3.

In this way, with the second embodiment, it is determined whether or not the specific device which is the NTP message sending source is subject to monitoring, and the specific device is added to the monitoring subjects as necessary. Because of this, by setting the NTP client 118 (FIG. 2) to perform time synchronization with the NTP server 250 (FIG. 2) of the monitoring PC 200, it is possible to monitor each printer by the monitoring PC 200 without registering in advance the information relating to each printer to the monitoring subject information.

With the second embodiment, it is determined whether or not to add the specific device to the monitoring subjects according to the instruction of the user, but it is also possible to add the specific device to the monitoring subjects using another method. For example, it is also possible that the monitoring PC 200 sends the identification information acquired at step S230 of FIG. 9 to the management server 300 (FIG. 2), and receives the information whether or not the specific device is subject to monitoring from the management server 300, so as to determine whether or not to add the specific device to the monitoring subjects. In this case, the management server 300 is able to determine whether or not the specific device should be subject to monitoring by comparing the identification information received from the monitoring PC 200 and the information relating to the printer subject to monitoring stored in the printer management database 320.

It is also possible to add the specific device to the monitoring subjects automatically when the specific device meets a monitoring subject addition condition which is set for the monitoring PC 200 in advance. By adding the specific device in this way, even when there are many printers subject to monitoring, so long as each printer is set to perform time synchronization to the same monitoring PC 200, it is possible to add each printer to the monitoring subjects. As a result, it is possible to omit registration of each printer to the monitoring subject information in advance, so setting of the monitoring subject information become easier. Also, by suitably setting the monitoring subject adding condition, an existing printer, a printer of a different manufacturer, or a device other than a printer may be registered as monitoring subjects as long as these devices are able to access the NTP server, and these printers or devices may be monitored. Furthermore, when it becomes necessary to change the monitoring subject after the fact, it is possible to change the monitoring subjects by changing the monitoring subject adding condition. In this case, the devices subject to monitoring are automatically registered at the time when each device power is turned on again after the monitoring subject adding condition is changed.

C. Third Embodiment

Figure 11:
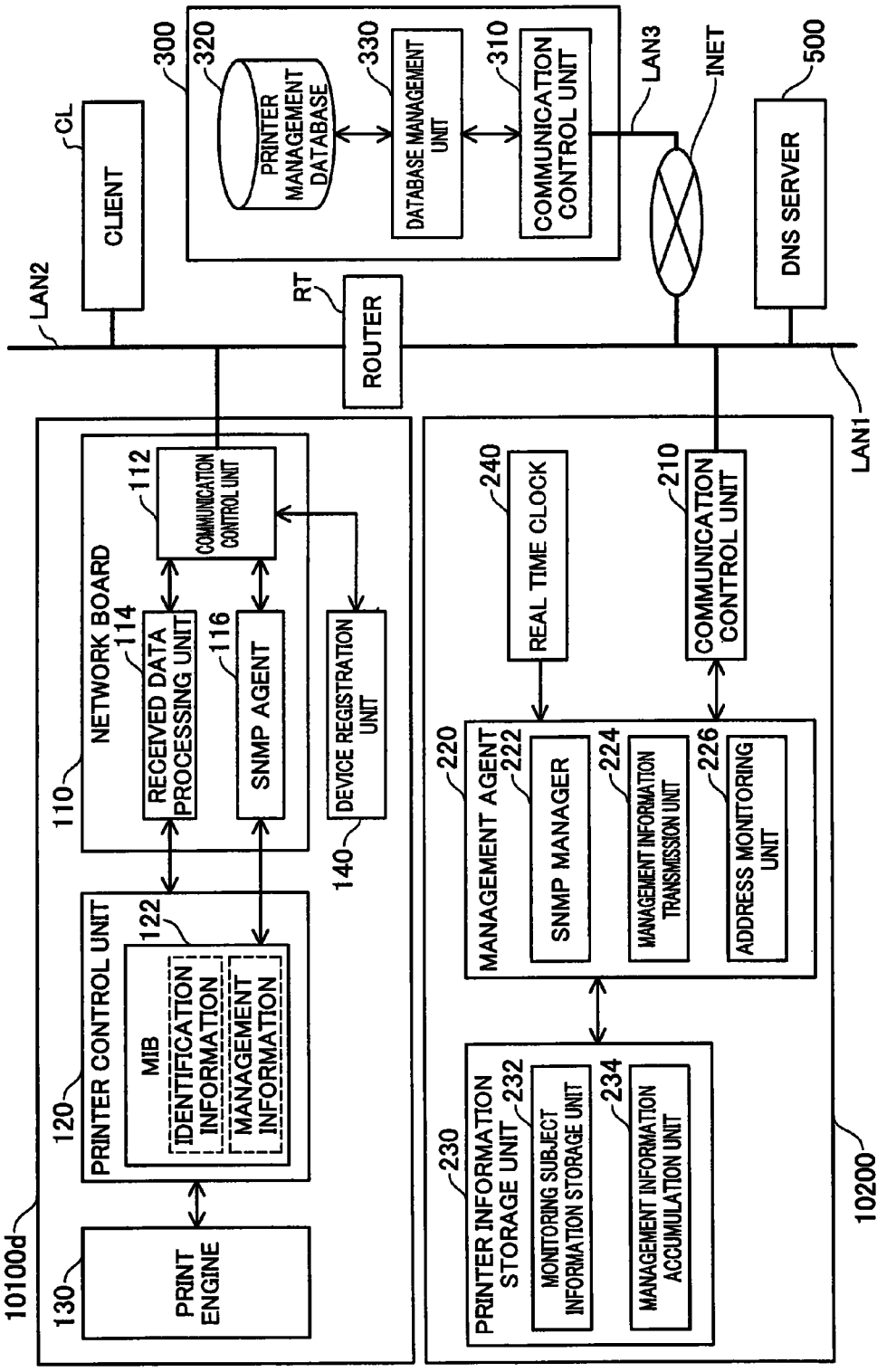
FIG. 11 is an explanatory drawing showing the configuration of the network device that constitutes the printer management system of the third embodiment.

FIG. 11 is an explanatory drawing showing the configuration of the network device that constitutes the printer management system of the third embodiment. The printer management system of the third embodiment shown in FIG. 11 differs from the printer management system of the first embodiment shown in FIG. 2 in that the printer 100*d* and the monitoring PC 200 are replaced by the printer 10100*d* and the monitoring PC 10200 respectively, and in that a DNS (Domain Name System) server 500 is provided on the local area network LAN1. The remaining points are the same as with the first embodiment shown in FIG. 2.

The printer 10100*d* shown in FIG. 11 differs from the printer 100*d* shown in FIG. 2 in that it is equipped with a device registration unit 140 and in that the NTP client and the timer are omitted. The monitoring PC 10200 shown in FIG. 11 differs from the monitoring PC 200 shown in FIG. 2 in that the NTP server 250 is omitted.

The device registration unit 140 of the printer 10100*d* registers the IP address and the host name of the printer 10100*d* to the DNS server 500. The registration of the IP address and the host name by the device registration unit 140 is described later. Here, the host name is a name set for each device so that the user is more easily able to recognize the network devices.

Figure 12:
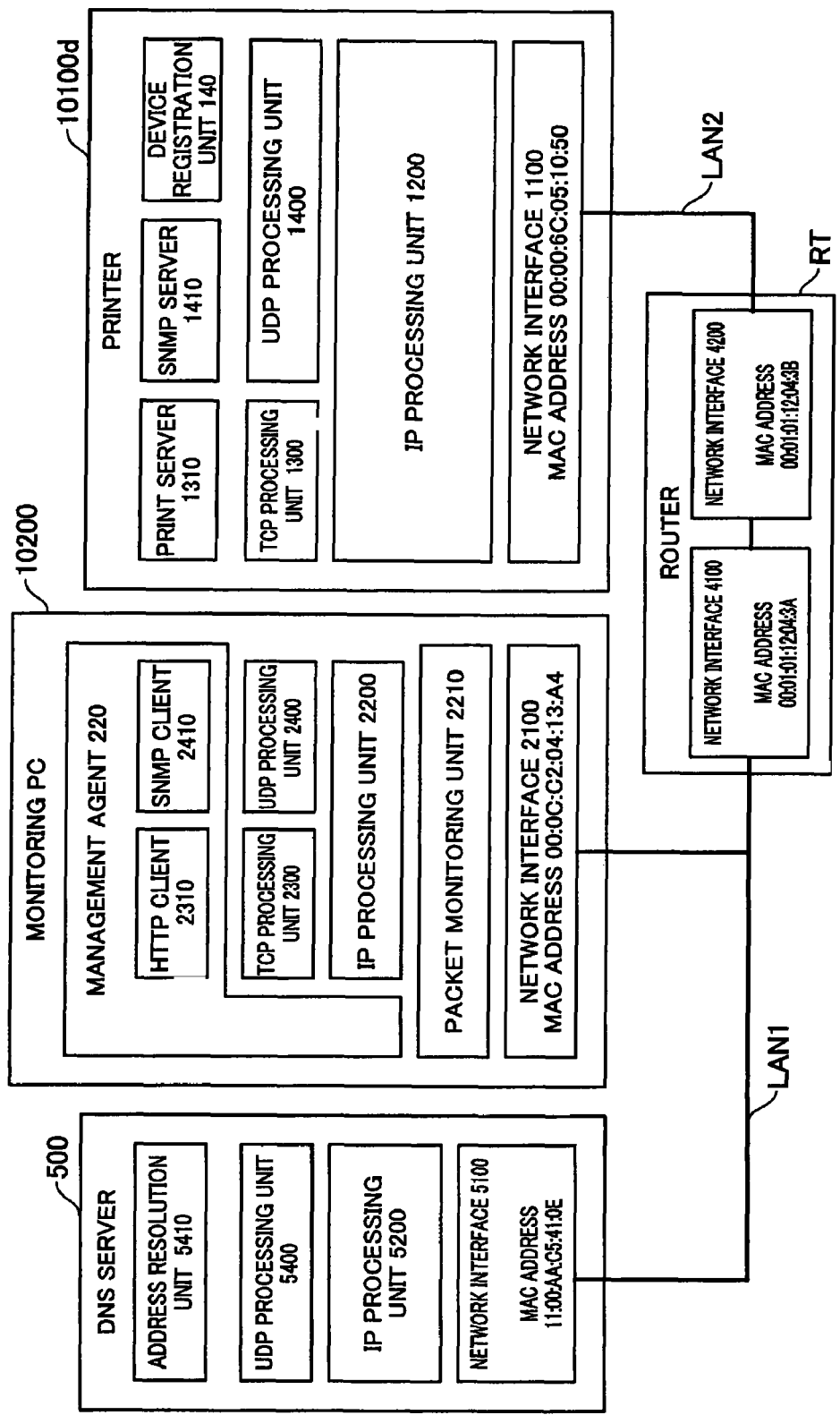
FIG. 12 is a block diagram showing the hierarchical structure of the functions relating to data communication between the monitoring PC, the printer, and the DNS server.

FIG. 12 is a block diagram showing the hierarchical structure of the functions relating to data communication between the monitoring PC 10200, the printer 10100*d*, and the DNS server 500. The block diagram of FIG. 12 differs from the block diagram of the first embodiment in FIG. 4 in that the printer 10100*d*, the monitoring PC 10200, and the functional block are changed, and in that the DNS server 500 has been added. The remaining points are the same as in FIG. 4.

The printer 10100*d* shown in FIG. 12 differs from the printer 100*d* shown in FIG. 4 in that the NTP client 118 (FIG. 4) provided at the upper part of the UDP processing unit 1400 is replaced with the device registration unit 140. The remaining points are the same as for the printer 100*d* in FIG. 4.

In the monitoring PC 10200 shown in FIG. 12, the function of the NTP server 250 of the first embodiment monitoring PC 200 (FIG. 4) is removed. The network interface 2100 of the monitoring PC 10200 is set so that, in addition to MAC frames for which the destination MAC address is the network interface 2100 MAC address "00:0C:C2:04:13:A4," it can also receive MAC frames for which the destination MAC address is different from the MAC address of the network interface 2100.

The DNS server 500 has an address resolution unit 5410 at its topmost layer. At the lower layer of the address resolution unit 5410, in sequence from the top, the UDP processing unit 5400, the IP processing unit 5200, and the network interface 5100 are provided. The functions and configuration of the UDP processing unit 5400 and the IP processing unit 5200 are the same as those of the UDP processing unit 2400 and the IP processing unit 2200 of the monitoring PC 10200. For the network interface 5100 as well, MAC addresses are assign in the same way as with the other network interfaces 1100, 2100, 4100, and 4200.

The address resolution unit 5410 has a correspondence table of the host names and the IP addresses (address resolution table). The address resolution unit 5410 may obtain the IP address from the host name or may obtain the host name from the IP address by referencing this address resolution table. Because of this, with the devices on the local area networks LAN1 and LAN2, it is possible to make an inquiry about the IP address to the DNS server 500 using the host name, and to acquire the IP address that identifies a device having that host name. Acquiring the network identifier such as the IP address from the name (network name) such as the host name in this way is generally called "address resolution."

The address resolution unit 5410 can also receive a set of the host name and the IP address via the local area network LAN1, and rewrite the address resolution table using the received host name and IP address.

Figure 13:
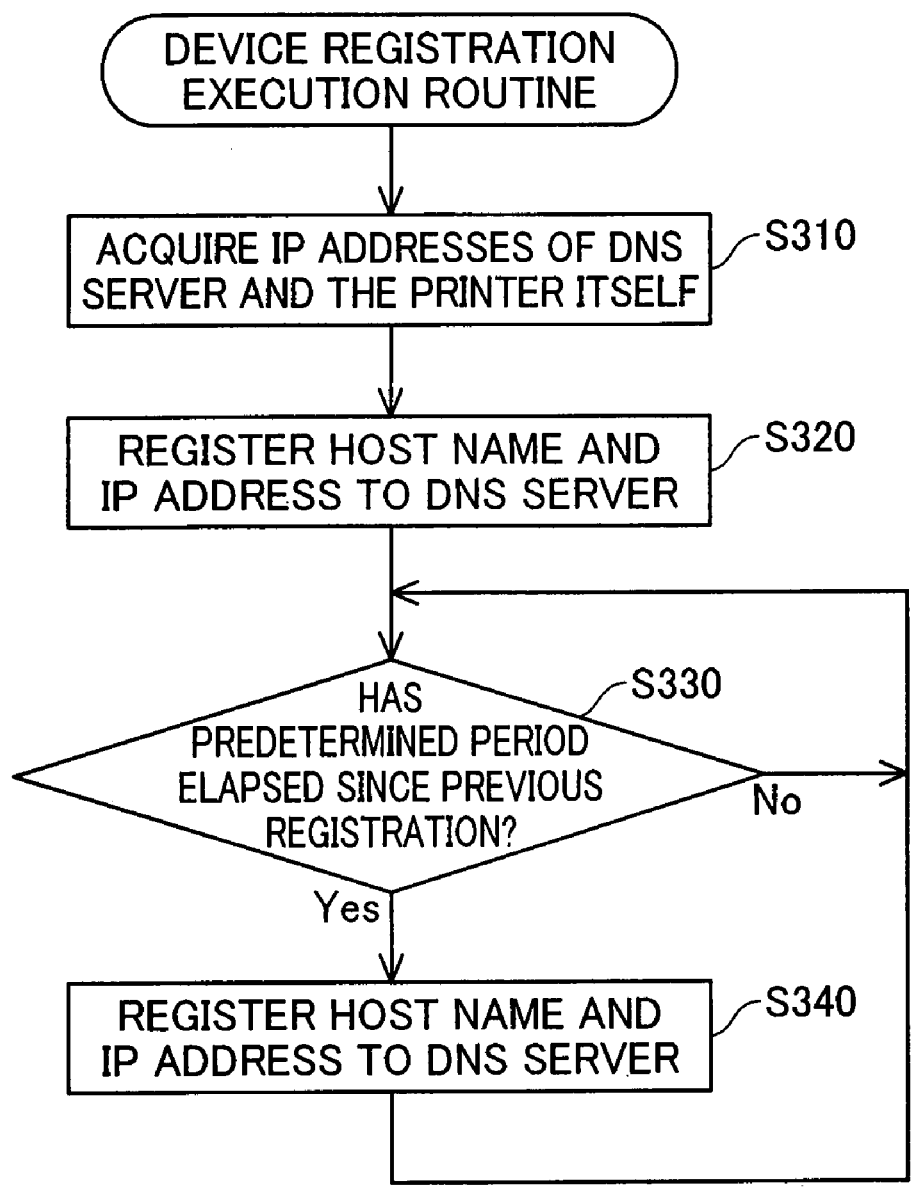
FIG. 13 is a flowchart showing the device registration execution routine executed by the device registration unit.

FIG. 13 is a flowchart showing the device registration execution routine executed by the device registration unit 140 of the printer 10100*d*. This device registration execution routine is executed when the printer 10100*d* is started up.

At step S310, the device registration unit 140 captures the IP address of the printer 10100*d* itself and the IP address of the DNS server 500. Specifically, the device registration unit 140 requests assignment of an IP address to the DHCP server (not illustrated) provided on the local area network LAN2 and notification of the IP address of the DNS server 500. The DHCP server assigns an IP address that can be used with the local area network LAN2 to the printer 100 and notifies the assigned IP address and the IP address of the DNS server to the device registration unit 140.

At step S320, the device registration unit 140 registers set of the host name of the printer 10100*d* and IP address assigned at step S310 of the printer 10100*d* to the DNS server 500. Specifically, the device registration unit 140 stores its own host name and the IP address in a predetermined format message (hereafter also called "registration message") and sends the message to the DNS server 500.

With the example in FIG. 12, when the registration message is sent from the printer 10100*d* to the DNS server 500, the MAC address of the network interface 5100 (11:00:AA: C5:41:0E) is stored in the destination MAC address of the MAC frame sent on the local area network LAN1. Thus the network interface 5100 receives the MAC frame that sends the registration message. The registration message is supplied to the registration message to the address resolution unit 5410 via the IP processing unit 5200 and the UDP processing unit 5400. The address resolution unit 5410 rewrites the address resolution table using the set of the host name and IP address received in this way.

As described above, the monitoring PC 10200 network interface 2100 also receives MAC frames that differ from those for which the destination MAC address is the MAC address "00:0C:C2:04:13:A4" assigned to the network interface 2100. Because of this, the MAC frame that sends the registration message to the DNS server 500 is also received by the network interface 2100.

At step S330 in FIG. 13, the device registration unit 140 determines whether or not a predetermined period has elapsed since the previous registration. When it is determined that a predetermined period has not elapsed since the previous registration, the control returns to step S330 and that is repeatedly executed. On the other hand, when it is determined that a predetermined period has elapsed since the previous registration, the control moves to step S340. At step S340, the same as with step S320, a registration message containing its own host name and IP address is sent to the DNS server 500. After sending of the registration message at step S340, the control returns to step S330. As a result, the address resolution table of the DNS server 500 is updated at predetermined intervals. The registration of the host name and the IP address to the DNS server 500 may also be performed only once at the time of every starting up of the printer 10100*d*.

Figure 14:
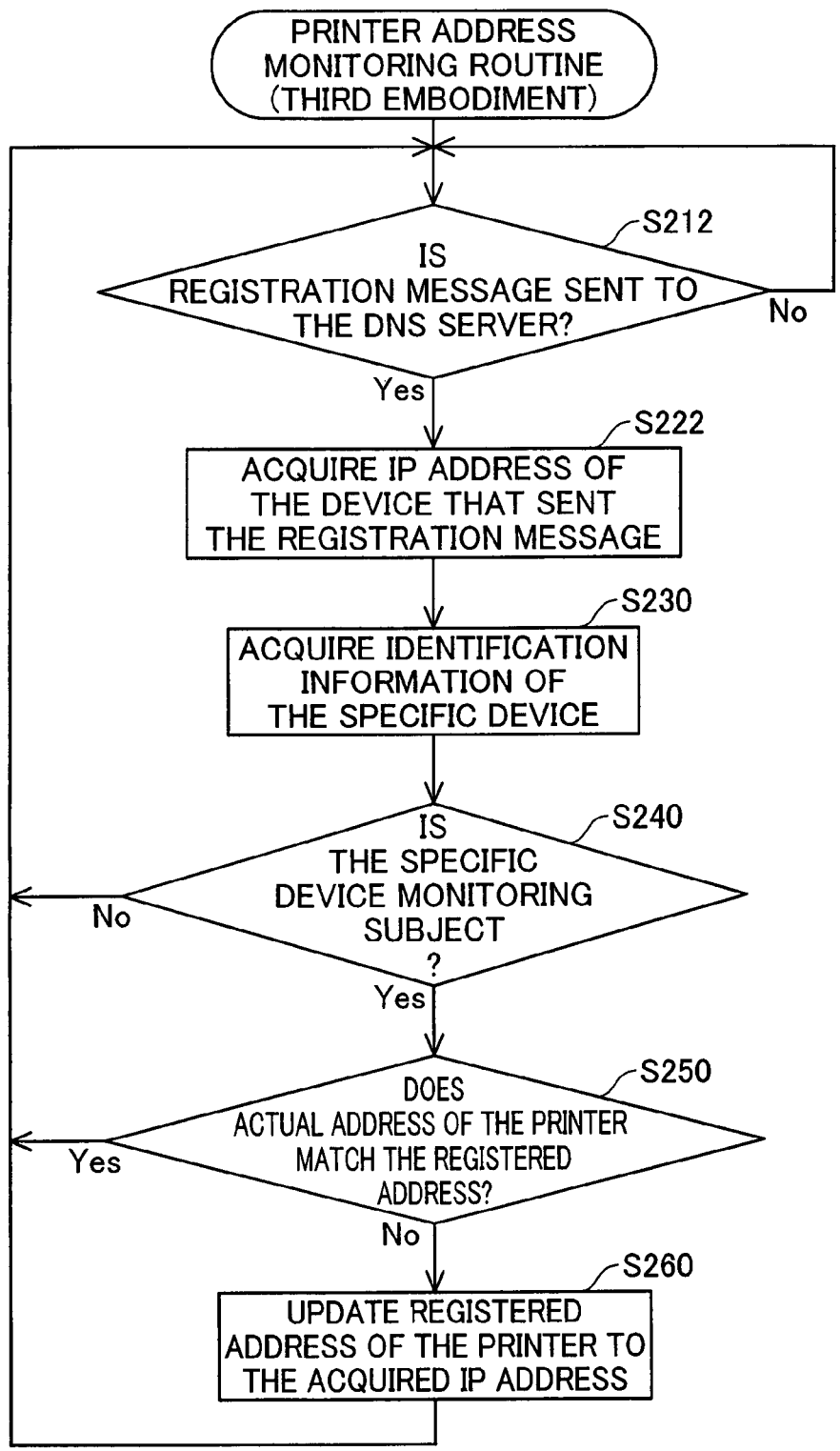
FIG. 14 is a flowchart showing the printer address monitoring routine executed by the address monitoring unit in the third embodiment.

FIG. 14 is a flowchart showing the printer address monitoring routine executed by the address monitoring unit 226 (FIG. 11) of the monitoring PC 10200 for the third embodiment. The routine of the third embodiment shown in FIG. 14 differs from the routine of the first embodiment shown in FIG. 7 in that step S210 and step S220 are replaced by step S212 and step S222 respectively. The other points are the same as the routine of the first embodiment shown in FIG. 7.

At step S212, the address monitoring unit 226 determines whether or not the registration message is sent to the DNS server 500. Specifically, the address monitoring unit 226 monitors the destination port number of the received data captured by the packet monitoring unit 2210 (FIG. 12). When the destination port number is the port number used for sending the registration message, it is determined that the registration message is sent to the DNS server 500. When it is determined that the registration message is sent, the control moves to step S222. On the other hand, when it is determined that the registration message is not sent, the control returns to step S212 and that is repeatedly executed.

At step S222, the address monitoring unit 226 captures the IP address of the registration message sending source. The IP address of the registration message sending source may be captured from the source IP address of the received data contained in the registration message acquired by the packet monitoring unit 2210 (FIG. 12). After capturing of the IP address of the registration message sending source at step S222, the same processing as the first embodiment shown in FIG. 7 is performed. This allows the monitoring PC 10200 to capture the IP address of the printer 10100*d* that is subject to monitoring and to monitor the printer 10100*d* using the acquired IP address.

When the IP address is dynamically allocated as with the printer 10100*d* of the third embodiment, the network device that uses the printer 10100*d* must acquire the dynamically allocated IP address from the host name of the printer 10100*d*. Because of this, the printer 10100*d* generally notifies the allocated IP address and the host name to the DNS server 500 and so on. With the third embodiment, in this way, the monitoring PC 10200 is able to acquire the IP address of the printer 10100*d* from the message normally sent to the network by the printer 10100*d*. Because of this, it is possible to acquire the IP address of the printer 10100*d* without adding new functions to the printer 10100*d*, and to perform monitoring of the printer 10100*d* using the acquired IP address.

With the third embodiment, the printer 10100*d* notifies the IP address and the host name to the DNS server 500, but according to the configuration of the local area networks LAN1 and LAN2, the message sent by the printer 10100d and used for IP address acquiring at the monitoring PC 10200 and its sending destination are changed as appropriate.

For example, when the NBT (NetBIOS over TCP/IP) protocol is used on the network, and the address resolution is performed by WINS (Windows Internet Name Service: Windows is a trademark of Microsoft Corporation), the printer 10100d notifies the IP address and the NetBIOS name which is the network name to the WINS server. The monitoring PC 10200 is able to acquire the IP address of the printer 10100d from the message sent to the WINS server. Also, when using the Bonjour (trademark of Apple Computer Incorporated) on the network, the printer 10100d notifies the host name and the IP address to a plurality of particular devices on the network (sending of the message simultaneously to a plurality of particular devices on the network in this way is also called "multi casting"). The monitoring PC 10200 is able to acquire the IP address of the printer 10100d from the message that is multi casted to the network.

Furthermore, it is also possible for the message used for acquiring the IP address of the printer by the monitoring PC 10200 to not be a message used for address resolution as with the message described above. For example, with Bonjour, UPnP (Universal Plug and Play: UPnP is a trademark of the UPnP Implementers Corporation), or SLP (Service Location Protocol), it is also possible to identify the IP address of the printer 10100d using the message that notifies (advertises) to the devices on the network the network service provided by the printer 10100d. Generally, a message sent to the network from the printer 10100d according to a specific protocol and used for making it possible to use the printer 10100d on the network, in other words, a message for notifying (registering) the existence of the printer 10100d to the network may be used as the message used for IP address acquiring with the monitoring PC 10200.

In addition to the various messages described above, as the message used for acquiring the IP address by the monitoring PC 10200, it is also acceptable to use messages for assigning IP address to the printer 10100d, such as with the message used with DHCP, AutoIP. However, the message for allocating these IP addresses are sent (broadcast) to all the devices on the network, so depending on the network configuration, there may be cases when application is difficult.

D. Variations

The present invention is not limited to the above embodiments, and may be implemented in various ways within its essential scope. The variations described below are possible, for example.

D1. Variation 1

With each of the embodiments hereinabove, as shown in FIG. 3, the printer ID, the IP address, and the identification information of the printer subject to monitoring are stored in the monitoring subject information, but the information contained by the monitoring subject information is not limited to the example in FIG. 3.

For example, it is also possible to include only the IP address in the monitoring subject information. In this case, at step S240 of the printer address monitoring routine (FIG. 7, FIG. 9, FIG. 14), the identification information of the specific device acquired at step S230 is sent to the management server 300 (FIG. 2). Then, based on the information received from the management server 300, whether or not the specific device is a printer subject to monitoring is determined. However, the monitoring subject information more preferably contains the identification information of the printer subject to monitoring in order to reduce the traffic between the monitoring PC 200 and 10200 and the management server 300.

It is also possible that the monitoring subject information contains information relating to the individual device other than the printer subject to monitoring. In this case, by including a flag representing whether or not the individual device is the monitoring subjects in the monitoring subject information, it is possible to determine whether or not the device is a printer subject to monitoring by referring the flag value.

D2. Variation 2

With each of the embodiments hereinabove, the model name and manufacturer serial number are used as identification information for identifying individual printers. It is also possible to use any information that differs from printer to printer as the identification information. For example, when the manufacturer serial number is set to be mutually different for each printer, it is possible to use only the manufacturer serial number as the identification information. It is also possible use the MAC address for which an individual value is set for each network board as the identification information.

D3. Variation 3

With each of the embodiments hereinabove, the present invention is applied to a printer management system that acquires the management information using SNMP protocol. The present invention may also be applied to any printer management system that identifies the monitoring subject printers using IP addresses and that acquires the management information of the monitoring subject printers. For example, when the printers 100a to 100d and 10100d has a function of HTTP server, the monitoring PC 200 and 10200 may acquire the management information from a HTTP response to a HTTP request (a GET request) which is sent to the HTTP server to request sending of the management information from the monitoring PC 200 and 10200. In this case as well, because HTTP generally performs transmission of messages using TCP/IP, the monitoring PC 200 and 10200 are able to identify the printer subject to monitoring using the IP addresses acquired from the transmission data that send the NTP message or the registration message.

D4. Variation 4

With each of the embodiments hereinabove, printers for which the management agent 220 (FIG. 2) acquired various types of information are identified by the IP address. The printers for which information is subject to acquiring may also be identified by any identifier (network identifier) that identifies devices on the network. As this kind of network identifier, for example, it is also possible to use an AppleTalk (registered trademark of Apple Computer Incorporated) node ID. The value of this node ID also, the same as the IP address, is not a value assigned uniquely to the printer, but is rather a value for which different values may be assigned (variable) to a single unit printer. In this case, time synchronization by the printer is executed not by the NTP that uses the IP address, but instead by a protocol that uses the node ID as the network identifier.

D5. Variation 5

With each of the embodiments hereinabove, the printer management is performed by the management server 300 that receives management information acquired and accumulated by the monitoring PC 200 and 10200. It is also acceptable that the monitoring PC 200 and 10200 itself perform the printer management. In this case, a printer management database and a database management unit are provided to the monitoring PC 200 and 10200. Then, necessary processing such as accounting processing is performed based on the management information accumulated in the printer management database provided in the monitoring PC 200 and 10200.

D6. Variation 6

With each of the embodiments hereinabove, the invention is applied to printer management systems, but the invention may also be applied to network management systems that acquire management information from any network device. Generally, if the network devices that are subject to management are network devices for which it is desirable to have the time synchronized with the time server connected to the network, it is possible to apply the invention. The invention, for example, may be applied to any sort of network device such as control computer, fax device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A monitoring apparatus for monitoring a network device connected to a network, the monitoring apparatus comprising:
    a storage unit for storing monitoring subject information, wherein the monitoring subject information includes individual identification information for identifying a monitoring subject device, the individual identification information being associated with an IP address;
    a Network Time Protocol (NTP) server that synchronizes a timer of the network device in response to an NTP message from the network device;
    a first acquiring unit that acquires an individual identification information of the network device which has sent the NTP message, by making a request to a destination IP address of the NTP message;
    a determining unit that determines whether or not the acquired individual identification information of the network device is associated with the monitoring subject information, by searching the monitoring subject information stored in the storage unit for the acquired individual identification information, and, if the determining unit determines that the acquired individual identification information of the network device is associated with the monitoring subject information, the determining unit determines that the network device identified by the acquired individual identification information is the monitoring subject device;
    when the network device identified by the acquired individual identification information is determined to be the monitoring subject device by the determining unit, a changing unit that changes the IP address associated in the monitoring subject information into the destination IP address of the NTP message; and
    a second acquiring unit that acquires management information related to the monitoring subject device utilizing the IP address of the monitoring subject information stored in the storing unit;
    wherein the first acquiring unit sends a request for the individual identification information of the network device to the destination IP address extracted from the NTP message received from the network device, and acquires the individual identification information from the network device which has sent the NTP message.

2. The monitoring apparatus in accordance with claim 1, wherein
    the network device sends the Network Time Protocol (NTP) message to the NTP server when the network device is started up.

3. The monitoring apparatus in accordance with claim 1, wherein
    the network device sends the Network Time Protocol (NTP) message to the NTP server at least once every predetermined period.

4. The monitoring apparatus in accordance with claim 1, further comprising: a registering unit that registers an individual identification information of a network device determined not to be the monitoring subject device by the determining unit, with the storage unit in response to instruction from user of the monitoring.

5. The network device monitoring apparatus in accordance with claim 1, further comprising: a registering unit that registers an individual identification information of a network device determined not to be the monitoring subject device by the determining unit, with the storage unit, when the network device determined not to be the monitoring subject device matches a predetermined condition.

6. The monitoring apparatus in accordance with claim 1, further comprising: a registering unit that registers an individual identification information of a network device determined not to be the monitoring subject device by the determining unit, with the storage unit in response to instruction from a management connected to the network.

7. The monitoring apparatus in accordance with claim 1, wherein the individual identification information includes a model name and manufacturer serial number of the network device.

8. A method for monitoring a network device connected to a network, the method comprising:
    storing monitoring subject information, wherein the monitoring subject information includes individual identification information for identifying a monitoring subject device, the individual identification information being associated with an IP address;
    synchronizing, by an Network Time Protocol (NTP) server, a timer of the network device in response to an NTP message from the network device;
    acquiring, by a first acquiring unit, an individual identification information of the network device which has sent the NTP message, by making a request to a destination IP address of the NTP message;
    determining, by a determining unit, whether or not the acquired individual identification information of the network device is associated with the monitoring subject information, by searching the monitoring subject information stored in the storage unit for the acquired individual identification information, and, if the determining unit determines that the acquired individual identification information of the network device is associated with the monitoring subject information, determining that the network device identified by the acquired individual identification information is the monitoring subject device;
    when the network device identified by the acquired individual identification information is determined to be the monitoring subject device by the determining unit, changing the IP address associated in the monitoring subject information into the destination IP address of the NTP message; and acquiring, by a second acquiring unit, management information related to the monitoring subject device utilizing the IP address of the monitoring subject information stored in the storing unit;

wherein the acquiring by the first acquiring unit includes:
sending, by the first acquiring unit, a request for the individual identification information of the network device to the destination IP address extracted from the NTP message received from the network device; and
acquiring, by the first acquiring unit, the individual identification information from the network device which has sent the NTP message.

9. A computer program product for monitoring a network device connected to a network, the computer program product comprising:

a non-transitory computer-readable medium; and a computer program stored on the non-transitory computer-readable medium, the computer program comprising computer instructions that cause a computer executing the computer instruction to perform a method for monitoring the network device connected to a network, said method comprising:

storing monitoring subject information, wherein the monitoring subject information includes individual identification information for identifying a monitoring subject device, the individual identification information being associated with an IP address;

synchronizing, by an Network Time Protocol (NTP) server, a timer of the network device in response to an NTP message from the network device;

acquiring, by a first acquiring unit, an individual identification information of the network device which has sent the NTP message, by making a request to a destination IP address of the NTP message;

determining, by a determining unit, whether or not the acquired individual identification information of the network device is associated with the monitoring subject information, by searching the monitoring subject information stored in the storage unit for the acquired individual identification information, and, if the determining unit determines that the acquired individual identification information of the network device is associated with the monitoring subject information, determining that the network device identified by the acquired individual identification information is the monitoring subject device;

when the network device identified by the acquired individual identification information is determined to be the monitoring subject device by the determining unit, changing the IP address associated in the monitoring subject information into the destination IP address of the NTP message,; and acquiring, by a second acquiring unit, management information related to the monitoring subject device utilizing the IP address of the monitoring subject information stored in the storing unit;

wherein the acquiring by the first acquiring unit includes:
sending, by the first acquiring unit, a request for the individual identification information of the network device to the destination IP address extracted from the NTP message received from the network device; and
acquiring, by the first acquiring unit, the individual identification information from the network device which has sent the NTP message.

* * * * *